US012729511B2

(12) United States Patent
Sai et al.

(10) Patent No.: US 12,729,511 B2
(45) Date of Patent: Sep. 8, 2026

(54) ELECTRIC WORKING MACHINE

(71) Applicant: Kubota Corporation, Osaka (JP)

(72) Inventors: Takuma Sai, Sakai (JP); Kiyoshi Matsui, Sakai (JP); Junki Ito, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 44 days.

(21) Appl. No.: 18/889,689

(22) Filed: Sep. 19, 2024

(65) Prior Publication Data

US 2025/0012050 A1 Jan. 9, 2025

Related U.S. Application Data

(63) Continuation of application No. PCT/JP2023/008994, filed on Mar. 9, 2023.

(30) Foreign Application Priority Data

Mar. 31, 2022 (JP) ................................ 2022-060019

(51) Int. Cl.
*E02F 9/20* (2006.01)
*B60L 1/00* (2006.01)
(Continued)

(52) U.S. Cl.
CPC ............. *E02F 9/207* (2013.01); *B60L 1/003* (2013.01); *E02F 9/2004* (2013.01);
(Continued)

(58) Field of Classification Search
CPC ....... E02F 9/207; E02F 9/2004; E02F 9/2203; E02F 9/26; E02F 9/2285; E02F 9/2292;
(Continued)

(56) References Cited

U.S. PATENT DOCUMENTS

2011/0190986 A1* 8/2011 Bitou .................... B62D 5/064 701/41
2017/0370073 A1* 12/2017 Fukuda ................ E02F 3/3414
(Continued)

FOREIGN PATENT DOCUMENTS

JP 2017227202 A 12/2017
JP 2020039239 A 3/2020
JP 2021080707 A 5/2021

OTHER PUBLICATIONS

International Search Report in PCT/JP2023/008994, mailed May 9, 2023, 2 pages.

*Primary Examiner* — Sihar A Karwan
(74) *Attorney, Agent, or Firm* — Keating & Bennett, LLP

(57) ABSTRACT

An electric working machine includes an electric motor to use electric power received from a battery via an inverter to drive a hydraulic pump to deliver hydraulic fluid to actuate a hydraulic device. A controller to control driving of the inverter and the electric motor is configured or programmed to gradually increase a rotation speed of the electric motor such that the rotation speed of the electric motor reaches a target rotation speed in a longer time when the electric motor is started in a state in which a temperature of hydraulic fluid detected by a fluid temperature detector is lower than or equal to a predetermined temperature than when the electric motor is started in a state in which the temperature of hydraulic fluid is higher than the predetermined temperature.

13 Claims, 10 Drawing Sheets

(51) Int. Cl.

*E02F 9/22* (2006.01)
*E02F 9/26* (2006.01)
*F15B 19/00* (2006.01)
*H02P 23/20* (2016.01)

(52) U.S. Cl.

CPC .............. *E02F 9/2203* (2013.01); *E02F 9/26* (2013.01); *F15B 19/00* (2013.01); *H02P 23/20* (2016.02); *B60L 2200/40* (2013.01); *B60L 2240/36* (2013.01); *B60L 2240/421* (2013.01); *B60L 2240/52* (2013.01); *B60L 2250/00* (2013.01); *E02F 9/2285* (2013.01); *E02F 9/2292* (2013.01)

(58) Field of Classification Search

CPC ........ E02F 9/20; B60L 1/003; B60L 2200/40; B60L 2240/36; B60L 2240/421; B60L 2240/52; B60L 2250/00; F15B 19/00; F15B 13/0422; F15B 2211/20576; F15B 2211/329; F15B 21/10; F15B 2211/20515; F15B 2211/20538; F15B 2211/355; F15B 2211/633; F15B 2211/6343; F15B 2211/6355; F15B 2211/6651; F15B 21/047; F15B 2211/851; F15B 2211/8609; F15B 21/04; F15B 21/045; H02P 23/20

See application file for complete search history.

(56) References Cited

U.S. PATENT DOCUMENTS

2021/0025132 A1* 1/2021 Ishii ........................ B60L 53/14
2022/0275601 A1* 9/2022 Kunizawa .............. B60K 25/00

* cited by examiner

Lab

| Elapsed time [sec] | 0 | 1 | 2 | 3 | 4 | 5 | 6 | 10 | 14 | 18 | 20 | 21 | 22 | 23 | 24 | 25 |
|---|---|---|---|---|---|---|---|---|---|---|---|---|---|---|---|---|
| Motor rotation speed [rpm] | 0 | 20 | 40 | 100 | 180 | 290 | 400 | 900 | 1400 | 1900 | 2060 | 2130 | 2170 | 2190 | 2200 | 2200 |

Fig.3A

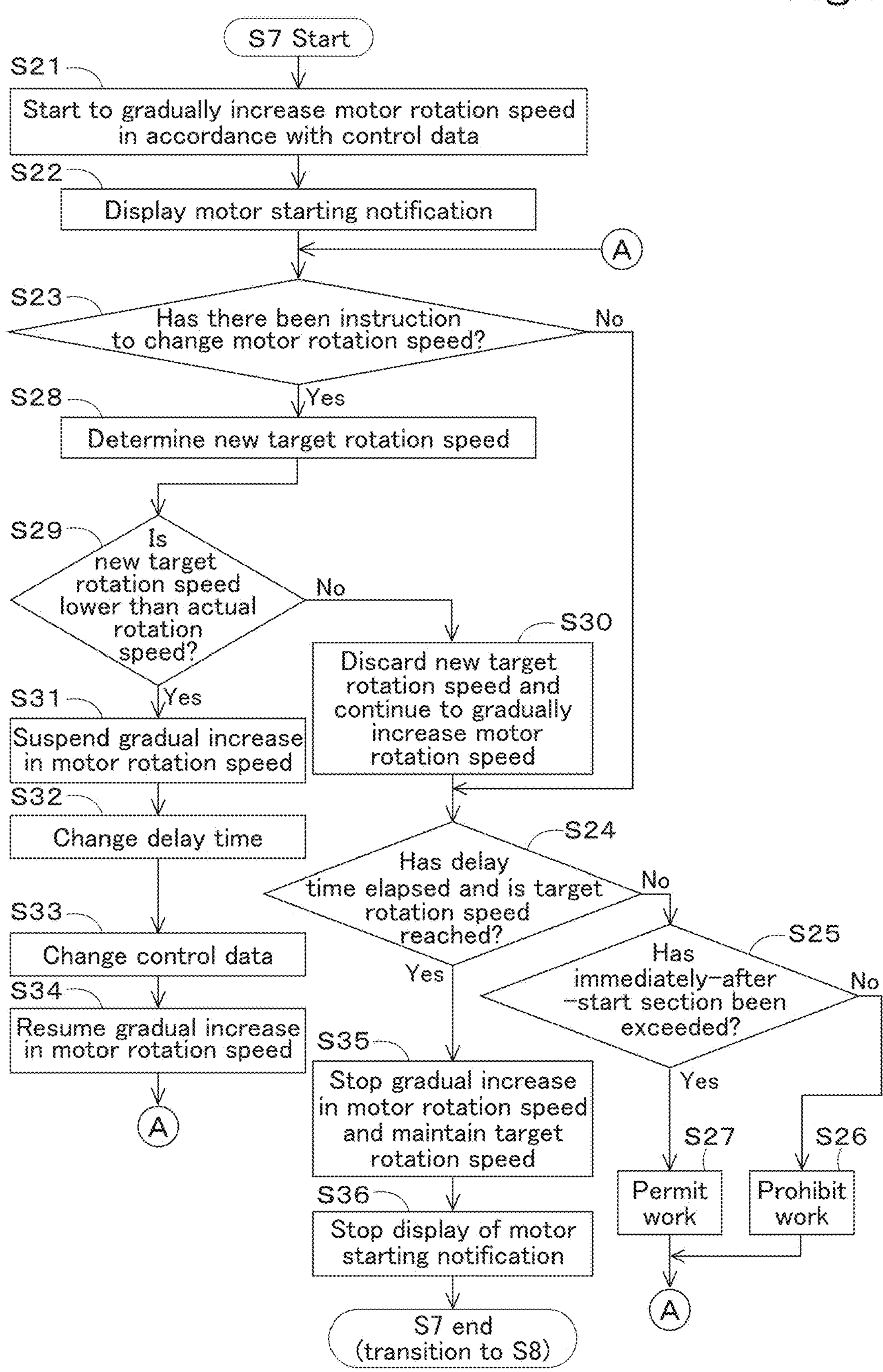
Fig.6
S7 Start
S21
Start to gradually increase motor rotation speed in accordance with control data
S22
Display motor starting notification
A
S23
Has there been instruction to change motor rotation speed?
No
Yes
S28
Determine new target rotation speed
S29
Is new target rotation speed lower than actual rotation speed?
No
S30
Discard new target rotation speed and continue to gradually increase motor rotation speed
Yes
S31
Suspend gradual increase in motor rotation speed
S32
Change delay time
S33
Change control data
S34
Resume gradual increase in motor rotation speed
A
S24
Has delay time elapsed and is target rotation speed reached?
No
Yes
S25
Has immediately-after-start section been exceeded?
No
Yes
S35
Stop gradual increase in motor rotation speed and maintain target rotation speed
S36
Stop display of motor starting notification
S7 end (transition to S8)
S27
Permit work
S26
Prohibit work
A 1
2
MT
10
ML, MR
4R
4
6
16
14
15
15
5
5c
X
11
12
24
21
20
3
13
C1
C5
18
C2
C3
A2
A1
22
23
C4

ELECTRIC WORKING MACHINE

CROSS REFERENCE TO RELATED APPLICATIONS

This application is a continuation application of International Application No. PCT/JP2023/008994, filed on Mar. 9, 2023, which claims the benefit of priority to Japanese Patent Application No. 2022-060019, filed on Mar. 31, 2022. The entire contents of each of these applications are hereby incorporated herein by reference.

BACKGROUND OF THE INVENTION

1. Field of the Invention

The present invention relates to electric working machines drivable by the power of an electric motor.

2. Description of the Related Art

For example, Japanese Unexamined Patent Application Publication No. 2021-80707 discloses an electric working machine driven by the power of an electric motor. The electric working machine disclosed in Japanese Unexamined Patent Application Publication No. 2021-80707 includes a battery unit, an electric motor driven by electric power output from the battery unit, an inverter that is connected to the battery unit and the electric motor and that adjusts the electric power to be output to the electric motor, a hydraulic pump driven by the electric motor to deliver a hydraulic fluid, a hydraulic device driven by the hydraulic fluid delivered by the hydraulic pump, a controller that controls the rotation speed of the electric motor according to the value of current output from the battery unit or the inverter, and the like.

SUMMARY OF THE INVENTION

Electric working machines are equipped with an electric motor as a prime mover. Since electric motors do not experience changes in output due to the temperature of a hydraulic fluid and an internal combustion engine, as occurs in internal combustion engines (engines), the rotation speed of the electric motor increases to a target rotation speed all at once when started. However, when the temperature of the hydraulic fluid is low and the kinematic viscosity thereof is high, if the electric motor is started and the rotation speed of the electric motor is increased to a high rotation speed all at once, the hydraulic pump may be suddenly actuated, the suction negative pressure may increase, and cavitation may occur. When cavitation occurs in the hydraulic fluid inside the hydraulic pump or the like, the hydraulic pump wears out, resulting in a shortened service life of the hydraulic pump.

Example embodiments of the present invention reduce or prevent cavitation in a hydraulic fluid in an electric working machine.

An electric working machine according to an example embodiment of the present invention includes a battery, an electric motor, an inverter to supply electric power of the battery to the electric motor to drive the electric motor, a hydraulic pump to be actuated by power of the electric motor, a hydraulic device to be actuated by a hydraulic pressure of a hydraulic fluid delivered from the hydraulic pump, a fluid temperature detector to detect a temperature of the hydraulic fluid, a rotation speed detector to detect a rotation speed of the electric motor, and a controller configured or programmed to control driving of the inverter and the electric motor and to gradually increase the rotation speed of the electric motor such that the rotation speed of the electric motor reaches a target rotation speed in a longer time when the electric motor is started in a state in which the temperature of the hydraulic fluid detected by the fluid temperature detector is lower than or equal to a predetermined temperature than when the electric motor is started in a state in which the temperature of the hydraulic fluid is higher than the predetermined temperature.

The electric working machine may include a specifier to be operated to specify the rotation speed of the electric motor, and when the electric motor is started in a state in which the temperature of the hydraulic fluid is lower than or equal to the predetermined temperature, the controller may be configured or programmed to determine a delay time, the delay time being a time until the rotation speed of the electric motor is stabilized at the target rotation speed, the target rotation speed being the rotation speed specified by the specifier, and gradually increase the rotation speed of the electric motor such that the rotation speed of the electric motor is stabilized at the target rotation speed after the delay time has elapsed from when the rotation speed of the electric motor starts to be increased.

The controller may be configured or programmed to calculate the target rotation speed according to an operating position of the specifier.

The electric working machine may include a storage to store in advance basic control data indicating a change in the rotation speed of the electric motor to stabilize the rotation speed of the electric motor at a predetermined basic target rotation speed over a predetermined basic delay time, and the controller may be configured or programmed to determine, as the delay time, a time until the rotation speed of the electric motor reaches the target rotation speed when the rotation speed of the electric motor is changed based on the basic control data.

The basic control data may be data including a curve indicating a correlation between the rotation speed of the electric motor and an elapsed time from an increase start time point of the rotation speed of the electric motor and include a basic end point at which the elapsed time is the basic delay time and the rotation speed of the electric motor is the basic target rotation speed, and the controller may be configured or programmed to correct the basic control data such that the basic end point coincides with a target end point at which the elapsed time is the delay time and the rotation speed of the electric motor is the target rotation speed so as to create control data indicating a change in the rotation speed of the electric motor to stabilize the rotation speed of the electric motor at the target rotation speed over the delay time and to control the rotation speed of the electric motor based on the control data.

The basic target rotation speed may be set to a predetermined maximum rotation speed that is settable for the electric motor, and the controller may be configured or programmed to create the control data by correcting the basic control data to be reduced such that the basic end point coincides with the target end point.

The specifier may be operable to specify a predetermined plurality of target rotation speeds, the electric working machine may include a storage to store in advance, for each of the plurality of target rotation speeds, the corresponding delay time and control data indicating a change in the rotation speed of the electric motor to stabilize the rotation speed of the electric motor at the corresponding target rotation speed over the corresponding delay time, and the controller may be configured or programmed to control the rotation speed of the electric motor based on the control data corresponding to any target rotation speed of the target rotation speeds, the target rotation speed being specified by the specifier.

The controller, when gradually increasing the rotation speed of the electric motor to stabilize the rotation speed of the electric motor at the target rotation speed, may be configured or programmed to compare an actual rotation speed of the electric motor detected by the rotation speed detector with a control value for the rotation speed of the electric motor indicated by the control data at each of predetermined timings, and control the rotation speed of the electric motor so as to bring the actual rotation speed closer to the control value.

Among an immediately-after-start section, an intermediate section, and an immediately-before-end section obtained by dividing a section from an increase start time point of the rotation speed of the electric motor to the delay time, the controller may be configured or programmed to increase the rotation speed of the electric motor in proportion to an elapsed time from the increase start time point during the intermediate section and change the rotation speed of the electric motor more gently during the immediately-after-start section and the immediately-before-end section than during the intermediate section.

The electric working machine may include a working device to be actuated by power of the hydraulic device, and an operation interface to operate actuation of the working device, and the controller may be configured or programmed to prohibit the actuation of the working device by operation of the operation interface during the immediately-after-start section.

The controller may be configured or programmed to determine a new target rotation speed according to an operating position of the specifier upon operation of the specifier when increasing the rotation speed of the electric motor in accordance with the control data, change the delay time and the control data according to the new target rotation speed when the new target rotation speed is higher than an actual rotation speed of the electric motor detected by the rotation speed detector, and control the rotation speed of the electric motor in accordance with the changed control data.

The electric working machine may include a display to display a notification indicating that the electric motor is being started while the rotation speed of the electric motor is gradually increased by the controller.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 3A is a table illustrating an example of basic control data for a rotation speed of an electric motor.

FIG. 6 is a flowchart illustrating an example of details of S7 in FIG. 5.

DETAILED DESCRIPTION OF THE EXAMPLE EMBODIMENTS

Figure 1:
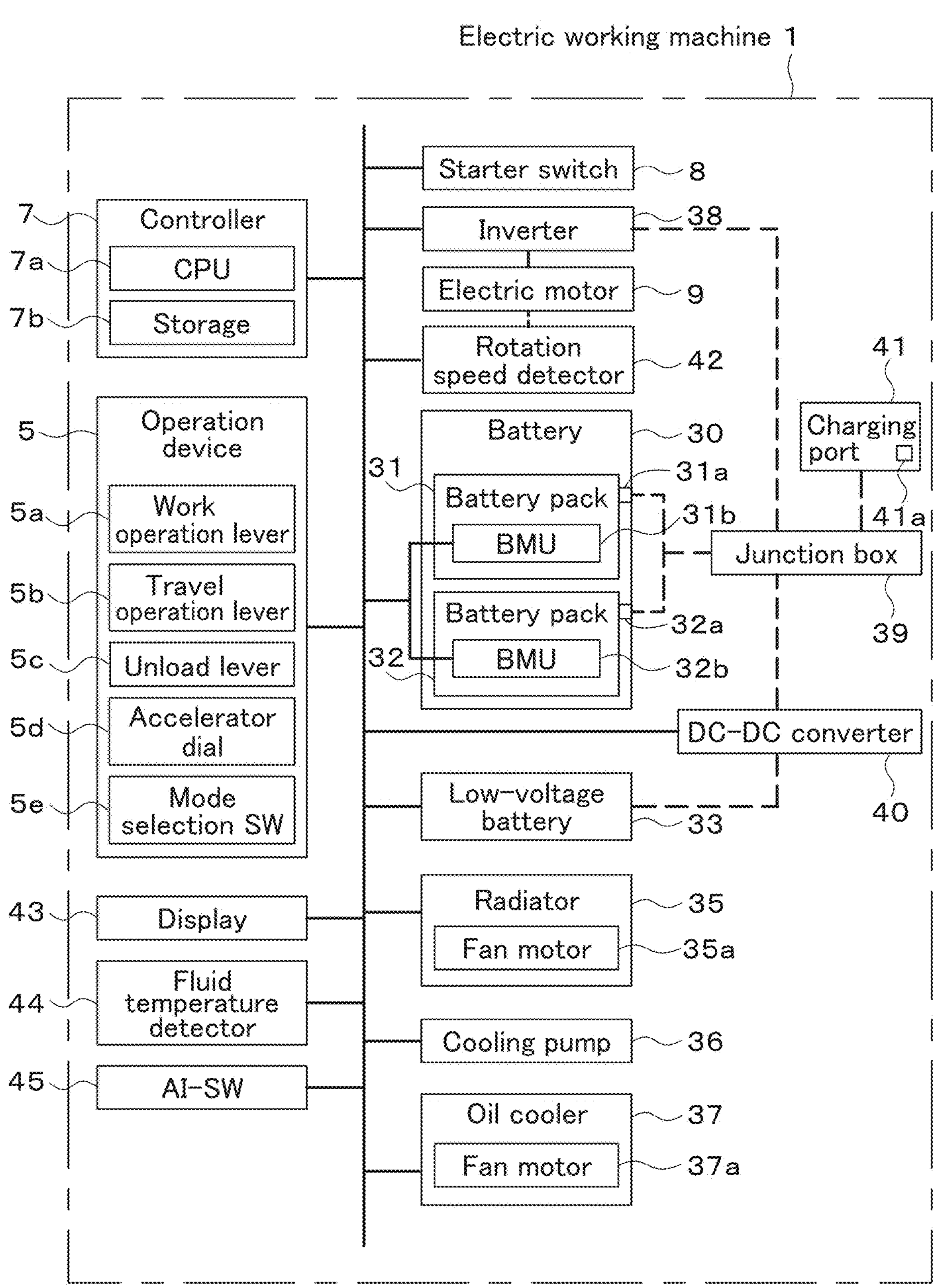
FIG. 1 is an electrical block diagram of an electric working machine.

Example embodiments will now be described with reference to the accompanying drawings, wherein like reference numerals designate corresponding or identical elements throughout the various drawings. The drawings are to be viewed in an orientation in which the reference numerals are viewed correctly.

Hereinafter, example embodiments of the present invention will be described with reference to the drawings.

Figure 9:
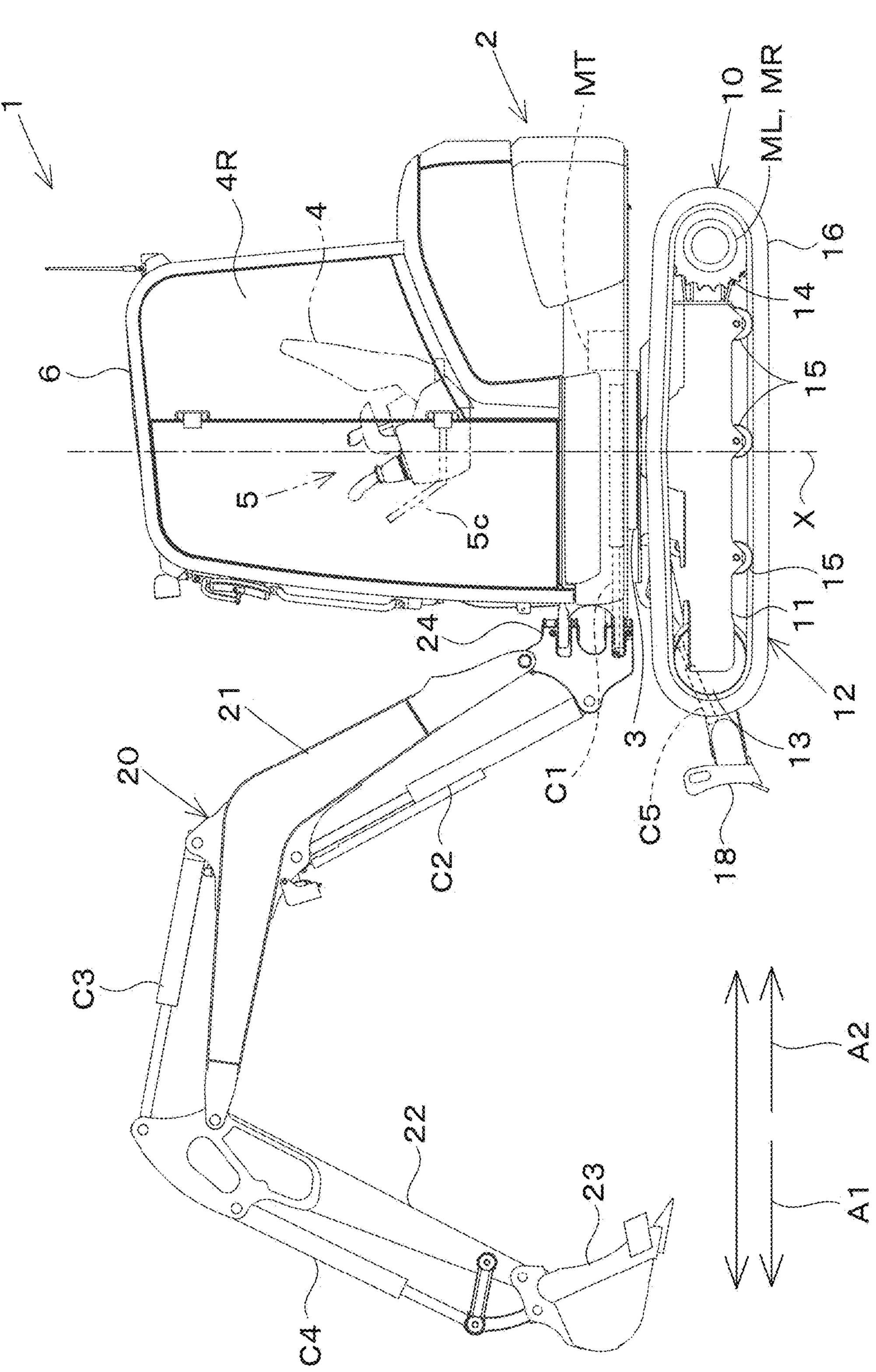
FIG. 9 is an overall side view of the electric working machine.

First, an overall configuration of an electric working machine 1 of the present example embodiment will be described. FIG. 9 is an overall side view of the electric working machine 1. The electric working machine 1 is an excavator called a backhoe, for example. The electric working machine 1 includes a machine body (swivel base) 2, a traveling device 10, a working device 20, and the like. The electric working machine 1 also includes an electric motor 9 (FIG. 1) as a prime mover and is operated by the power of the electric motor 9.

On top of the machine body 2 of the electric working machine 1, there are provided an operator's seat 4 to be seated by an operator (worker) and a protection mechanism 6 that protects the operator's seat 4 from the front, rear, left, right, and above. The protection mechanism 6 is called a cabin. Each side of the protection mechanism 6 is provided with a transparent portion (a so-called window) through which the surroundings can be viewed from the operator's seat 4. The protection mechanism 6 separates the interior space in which the operator's seat 4 is provided from the outside.

Around the operator's seat 4 inside the protection mechanism 6, there is provided an operation device 5 to operate the electric working machine 1. The operator can operate the operation device 5 while seated on the operator's seat 4. In the present example embodiment, the direction toward the working device 20 (arrow A1 direction in FIG. 9) from the protection mechanism 6 is described as the front, and the opposite direction thereof (arrow A2 direction in FIG. 9) is described as the rear. In addition, a horizontal direction perpendicular to the front-rear direction is described as a width direction. Furthermore, when facing the front A1, the left is described as the left, and the right as the right.

The traveling device 10 supports the machine body 2 in a travelable manner. The traveling device 10 includes a traveling frame (track frame) 11 and at least one traveling mechanism 12. The traveling frame 11 is a structure around which the traveling mechanism 12 is attached and above which the machine body 2 is supported. The traveling mechanism 12 is, for example, a crawler type traveling mechanism. The traveling mechanism 12 is provided on each of the left and right of the traveling frame 11. The traveling mechanism 12 includes an idler 13, a driving wheel 14, a plurality of rollers 15, an endless crawler belt 16, and traveling motors ML and MR.

The idler 13 is disposed at the front of the traveling frame 11. The driving wheel 14 is disposed at the rear of the traveling frame 11. The plurality of rollers 15 are provided between the idler 13 and the driving wheel 14. The crawler belt 16 is wound around the idler 13, the driving wheel 14, and the rollers 15.

The left traveling motor ML is included in the traveling mechanism 12 located on the left of the traveling frame 11. The right traveling motor MR is included in the traveling mechanism 12 located on the right of the traveling frame 11. These traveling motors ML and MR preferably are hydraulic motors, for example. In each of traveling mechanisms 12, the driving wheel 14 is rotationally driven by the power of the traveling motor ML or MR, causing the crawler belt 16 to circulate in the circumferential direction.

A dozer device 18 is attached to the front of the traveling device 10. The dozer device 18 swings up and down by the extension and contraction of a dozer cylinder C5. The dozer cylinder C5 is attached to the traveling frame 11. The dozer cylinder C5 preferably is a hydraulic cylinder, for example.

The machine body 2 is supported on the traveling frame 11 via a swivel bearing 3 so as to be rotatable around a swivel axis X. A swivel motor MT is provided inside the machine body 2. The swivel motor MT preferably is a hydraulic motor (a hydraulic actuator included in hydraulic devices), for example. The machine body 2 swivels around the swivel axis X by the power of the swivel motor MT.

The working device 20 is supported at the front of the machine body 2. The working device 20 includes a boom 21, an arm 22, a bucket (working tool) 23, and hydraulic cylinders C1 to C5. The base end of the boom 21 is pivotally mounted to a swing bracket 24 so as to be rotatable around a horizontal axis (an axis extending in the width direction of the machine body 2). Therefore, the boom 21 is capable of swinging up and down (vertically). The arm 22 is pivotally mounted on the distal end of the boom 21 so as to be rotatable around a horizontal axis. Therefore, the arm 22 is capable of swinging in the front-rear or up-down direction. The bucket 23 is provided at the distal end of the arm 22 so as to be capable of a shovel operation and dump operation.

Instead of the bucket 23 or in addition to the bucket 23, another working tool (hydraulic attachment) that can be driven by a hydraulic actuator can be attached to the distal end of the arm 22. Examples of the other working tool include a hydraulic breaker, a hydraulic crusher, an angle broom, an earth auger, a pallet fork, a sweeper, a mower, a snow blower, and the like.

The swing bracket 24 swings left and right by the extension and contraction of the swing cylinder C1 provided inside the machine body 2. The boom 21 swings up and down (back and forth) by the extension and contraction of the boom cylinder C2. The arm 22 swings up and down (back and forth) by the extension and contraction of the arm cylinder C3. The bucket 23 performs a shovel operation and dump operation by the extension and contraction of the bucket cylinder (working tool cylinder) C4. The swing cylinder C1, the boom cylinder C2, the arm cylinder C3, and the bucket cylinder C4 are constituted by hydraulic cylinders.

The electric working machine 1 performs work, such as excavation, by driving the traveling device 10 with the traveling motors ML and MR, driving the working device 20 with the hydraulic cylinders C1 to C5, and swiveling the machine body 2 with the swivel motor MT. Hydraulic actuators, such as the traveling motors ML and MR, the swivel motor MT, and the hydraulic cylinders C1 to C5, are included in hydraulic devices. Not only the working device 20 but also the traveling device 10 is a working device provided on the electric working machine 1. Hereinafter, for convenience, the working device 20 and the traveling device 10 will be collectively referred to as "working devices 20 and 10."

Next, an electrical configuration of the electric working machine 1 will be described. FIG. 1 is an electrical block diagram of the electric working machine 1. In FIG. 1, a controller 7 includes a CPU 7*a* and a storage 7*b*. The CPU 7*a* controls the operation of each unit of the electric working machine 1 illustrated in FIG. 1. The storage 7*b* preferably is a volatile memory, a nonvolatile memory, and the like. Information, data, programs, and the like used by the CPU 7*a* to control the operation of each unit are stored in a readable and writable manner in the storage 7*b*.

The operation device 5 includes operation interfaces such as a work operation lever 5*a*, a travel operation lever 5*b*, an unload lever 5*c*, an accelerator dial 5*d*, and a mode selection SW (switch) 5*e*. The operation device 5 also includes a potentiometer, a switch, a sensor, or the like (not illustrated) to detect whether each of the operation interfaces 5*a* to 5*e* is operated, the operating position thereof, or the operating amount thereof.

The work operation lever 5*a* is an operation interface usable to actuate the working device 20. The travel operation lever 5*b* is usable to actuate the traveling device 10. In FIG. 1, the work operation lever 5*a* and the travel operation lever 5*b* are each illustrated as one block for convenience. However, a plurality of work operation levers 5*a* and a plurality of travel operation levers 5*b* are actually provided.

The unload lever 5*c* is capable of being switched between a load position (first position) for permitting the actuation of the working device 20 and an unload position (second position) for not permitting (prohibiting) the actuation of the working device 20. The unload lever 5*c* is disposed, for example, at a side of the operator's seat 4 (FIG. 9) so as to be capable of swinging up and down.

By the unload lever 5*c* swinging down to be in the load position (first position, lowered position), the passage for the operator to get on and off an operator's room 4R is closed. By the unload lever 5*c* swinging up to be in the unload position (second position), the passage is opened.

The accelerator dial 5*d* is rotated to specify the rotation speed of the electric motor 9. The angle range in which the accelerator dial 5*d* can be rotated corresponds to a specification range in which the rotation speed of the electric motor 9 can be specified. Therefore, by changing the operating position of the accelerator dial 5*d*, a specified value for the rotation speed of the electric motor 9 can also be changed.

The controller 7 calculates the specified value for the rotation speed of the electric motor 9 according to the operation state of the accelerator dial 5*d* (whether it is operated and the operating position) and determines the specified value as a target rotation speed. At this time, for example, upon detecting the operating position of the accelerator dial 5*d*, the controller 7 may refer to an LUT (lookup table) stored in advance in the storage 7*b* to determine the specified value for the rotation speed of the electric motor 9 according to the operating position. Alternatively, for example, the controller 7 may convert a signal output from a switch or a sensor according to the operating position of the accelerator dial 5*d* into a digital value (such as a voltage value or a current value) and apply the digital value to an arithmetic equation stored in advance to calculate the specified value for the rotation speed of the electric motor 9. The accelerator dial 5*d* is an example of the "specifier" included in example embodiments of the present invention.

The mode selection SW 5*e* is a switch that is operated to select either a normal mode (first mode) to control the driving of the electric motor 9, or an ECO mode (ecology mode, second mode) to reduce electric power consumption more than the normal mode.

Inside the protection mechanism 6, there is provided a starter SW (switch) 8, which can be operated by the operator seated on the operator's seat 4. The starter SW 8 is operated to start and stop the electric working machine 1. Specifically, when the starter SW 8 is turned on, the controller 7 starts each unit of the electric working machine 1. In addition, when the starter SW 8 is turned off, the controller 7 stops each unit of the electric working machine 1.

The electric motor 9 is a drive source (one example of a prime mover) of the electric working machine 1 and preferably is, for example, a permanent magnet embedded type three-phase AC synchronous motor. An inverter 38 is a motor driving device that drives the electric motor 9. The inverter 38 is connected to the electric motor 9 and a junction box 39.

In addition to the inverter 38, the junction box 39 is connected to a battery 30, a DC-DC converter 40, and a charging port 41. The junction box 39 outputs electric power output from the battery 30 to the inverter 38 and the DC-DC converter 40.

The inverter 38 converts DC power input from the battery 30 via the junction box 39 into three-phase AC power and supplies the three-phase AC power to the electric motor 9. As a result, the electric motor 9 is driven. In addition, the inverter 38 can freely adjust the current and voltage of electric power to be supplied to the electric motor 9. The controller 7 controls the operation of the inverter 38 to drive and stop the electric motor 9.

A rotation speed detector 42 preferably is a sensor that detects the rotation speed (actual rotation speed) of the electric motor 9, an encoder, a pulse generator, or the like. The controller 7 controls, for example, the driving of the inverter 38 based on the rotation speed (actual rotation speed) of the electric motor 9 detected by the rotation speed detector 42, thereby controlling the driving and stopping of the electric motor 9. In addition, the controller 7 controls the driving of the electric motor 9 by the inverter 38 such that the actual rotation speed of the electric motor 9 detected by the rotation speed detector 42 coincides with the target rotation speed.

The DC-DC converter 40 is a voltage converter that converts the voltage of the DC power input from the battery 30 via the junction box 39 into a different voltage. In the present example embodiment, the DC-DC converter 40 is a step-down converter that converts a high voltage of the battery 30 into a predetermined low voltage according to electrical equipment provided in the electric working machine 1. The DC-DC converter 40 supplies electric power to a low-voltage battery 33 after voltage conversion. The electrical equipment provided in the electric working machine 1 includes lighting, a heater, and the like in addition to the units illustrated in FIG. 1.

The charging port 41 includes a connector (not illustrated) into which a charging cable (not illustrated) is fitted and a connection detector 41*a*. The charging port 41 is connected to an external power source (e.g., commercial power source) via the charging cable. The connection detector 41*a* preferably is a sensor or the like that detects the connection of the external power source by the charging cable fitted into the charging port 41.

The junction box 39 outputs, to the battery 30, electric power input from the external power source via the charging cable through the charging port 41. The battery 30 is charged with the electric power input from the charging port 41 via the junction box 39.

The battery 30 includes a plurality of battery packs 31 and 32. Each of the battery packs 31 and 32 is a secondary battery (storage battery) such as a lithium ion battery including at least one battery. When each of the battery packs 31 and 32 preferably is a plurality of batteries, the plurality of batteries are electrically connected in series and/or in parallel. In addition, the batteries of each of the battery packs 31 and 32 include a plurality of cells therein, and the plurality of cells are electrically connected in series and/or in parallel. Each of the battery packs 31 and 32 has an electric capacity sufficient to operate each unit of the electric working machine 1 for a predetermined time. The battery packs 31 and 32 are connected in parallel.

In the present example embodiment, the battery 30 is provided with the two battery packs 31 and 32. However, the number of battery packs included in the battery 30 is not limited to two and may be one, or three or more.

The battery packs 31 and 32 are provided with connection switches 31*a* and 32*a*, respectively. Each of the connection switches 31*a* and 32*a* preferably is, for example, a relay, a switch, or the like and can be switched between a connected state and a disconnected state.

The controller 7 outputs electric power from one of the plurality of battery packs 31 and 32 to the junction box 39 and stops the output of electric power from the other battery pack by switching one connection switch of the connection switches 31*a* and 32*a* to the connected state and switching the other connection switch to the disconnected state. That is, the controller 7 controls the output and stop of the electric power of each of the battery packs 31 and 32.

In addition, the controller 7 switches the connection state inside the junction box 39 to connect or disconnect the inverter 38, the DC-DC converter 40, or the charging port 41 to each of the battery packs 31 and 32. The junction box 39 and the connection switches 31*a* and 32*a* are connection switches that switch between connection and disconnection of the inverter 38, the DC-DC converter 40, and the charging port 41 to and from each of the battery packs 31 and 32.

Each of the battery packs 31 and 32 is further provided with BMUs (battery management units; battery monitors) 31*b* and 32*b*. In FIG. 1, the BMUs 31*b* and 32*b* are provided within the corresponding battery packs 31 and 32. However, the BMUs 31*b* and 32*b* may be built in the corresponding battery packs 31 and 32 or may be disposed outside the battery packs 31 and 32.

The BMU 31*b* monitors and controls the corresponding battery pack 31. The BMU 32*b* monitors and controls the corresponding battery pack 32. Specifically, the BMUs 31*b* and 32*b* control the opening and closing of relays provided inside the battery packs 31 and 32 to control the start and stop of electric power supply from the battery packs 31 and 32. In addition, the BMUs 31*b* and 32*b* detect the temperatures, voltages, currents, internal cell terminal voltages, or the like of the battery packs 31 and 32.

Furthermore, the BMUs 31*b* and 32*b* detect a remaining capacity (remaining electric power amount) of the battery packs 31 and 32 by a voltage measurement method, based on the internal cell terminal voltages of the battery packs 31 and 32, for example. Note that the method of detecting the remaining capacity of the battery packs 31 and 32 is not limited to the voltage measurement method, but may be other methods such as a Coulomb counting method, a battery cell modeling method, an impedance tracking method, and the like. In addition, a capacity detector to detect the remaining capacity of the battery packs 31 and 32 may be provided separately from the BMUs 31*b* and 32*b*.

The low-voltage battery 33 is a storage battery with a lower voltage than the battery 30. The low-voltage battery 33 is charged with electric power supplied from the DC-DC converter 40. The low-voltage battery 33 supplies the electric power to the electrical equipment provided in the electric working machine 1.

A radiator 35 cools cooling water for cooling high-heat generating electric devices such as the electric motor 9, the inverter 38, the DC-DC converter 40, and the battery 30. The high-heat generating electric devices are electric devices that generate more heat than other electric devices provided in the electric working machine 1 when operated with electric power. The cooling water is not simply water, but is a liquid that does not freeze even in cold regions.

The radiator 35 includes a fan motor 35*a*, a radiator fan that is rotationally driven by the power of the fan motor 35*a*, and a heat exchanger (not illustrated). The fan motor 35*a* is driven by the electric power of the low-voltage battery 33.

A cooling pump 36 is provided in a cooling water passage (not illustrated) disposed within the machine body 2 together with the radiator 35 and the above high-heat generating electric devices. The cooling pump 36 delivers and circulates the cooling water to and through the cooling water passage.

An oil cooler 37 cools the hydraulic fluid that has passed through hydraulic devices such as the hydraulic actuators ML, MR, MT, and C1 to C5 described above and hydraulic pumps P1 and P2 and a control valve CV (illustrated in FIG. 2 or the like) described below. The oil cooler 37 includes a fan motor 37*a*, an oil cooler fan that is rotationally driven by the power of the fan motor 37*a*, and a heat exchanger (not illustrated). The fan motor 37*a* is driven by the electric power of the low-voltage battery 33.

A display 43 preferably is a liquid crystal display, a touch panel, or the like, and displays various kinds of information. For example, the display 43 displays information indicating the driving state of the electric motor 9 or the like. A fluid temperature detector 44 preferably is a sensor that detects the temperature of the hydraulic fluid. Hereinafter, the temperature of the hydraulic fluid will be referred to as "hydraulic fluid temperature."

An AI (auto-idling)-SW (switch) 45 preferably is a pressure sensor that is actuated by the hydraulic pressure of the hydraulic fluid. The AI-SW 45 is turned on when at least one of the working devices 20 and 10 is actuated, and is turned off when neither of the working devices 20 and 10 is actuated. That is, the AI-SW 45 detects whether the working devices 20 and 10 are actuated.

Figure 2:
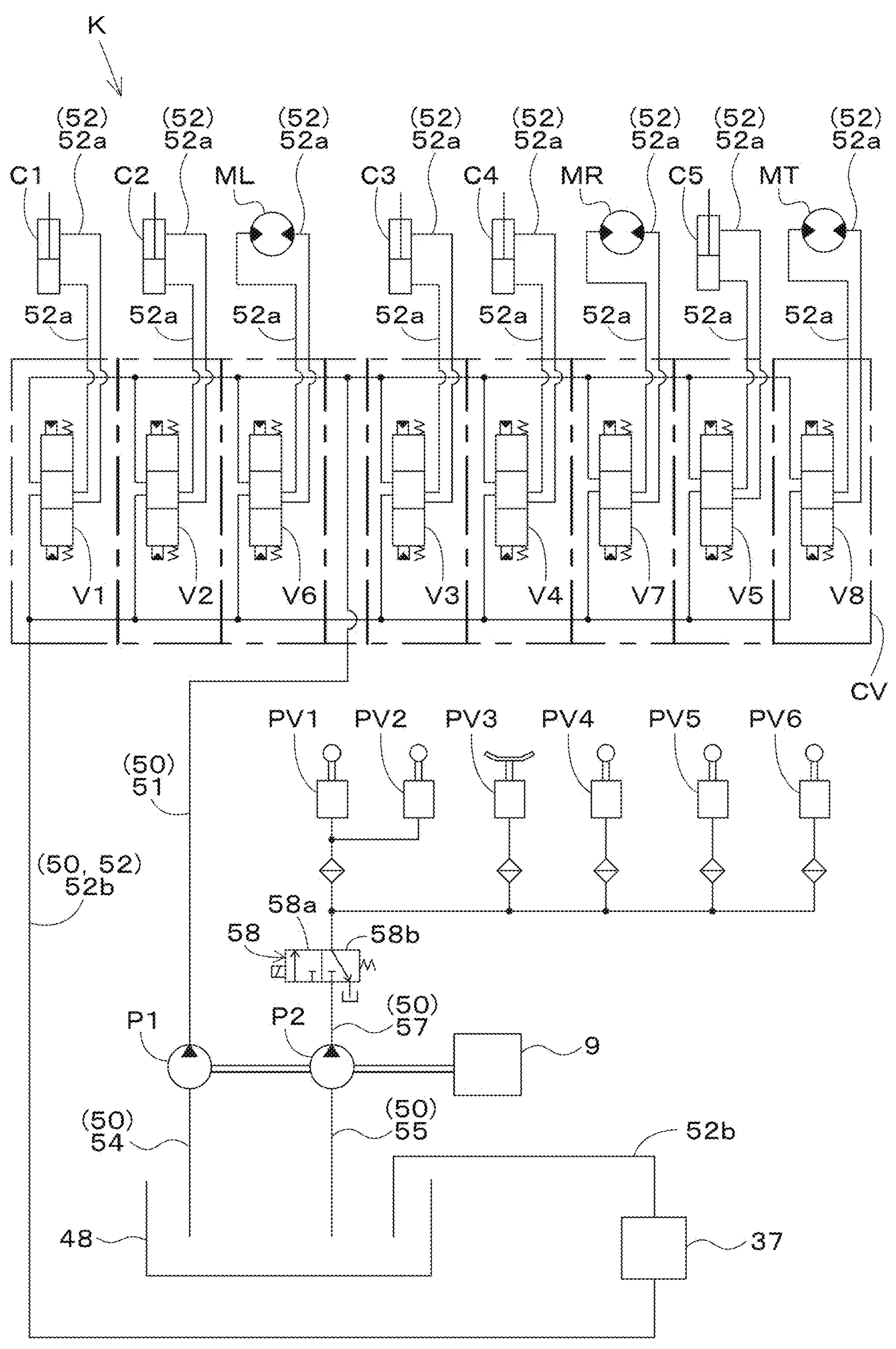
FIG. 2 is a hydraulic circuit diagram of the electric working machine.

Next, a hydraulic circuit provided in the electric working machine 1 will be described. FIG. 2 is a diagram illustrating a hydraulic circuit K provided in the electric working machine 1. The hydraulic circuit K is provided with hydraulic devices such as the hydraulic actuators C1 to C5, ML, MR, and MT, the control valve CV, the hydraulic pumps P1 and P2, a hydraulic fluid tank 48, the oil cooler 37, operation valves PV1 to PV6, an unload valve 58, and a fluid passage 50.

Of the plurality of hydraulic pumps P1 and P2, one is the actuation hydraulic pump P1 and the other is the control hydraulic pump P2. These hydraulic pumps P1 and P2 are driven by the power of the electric motor 9.

The actuation hydraulic pump P1 sucks the hydraulic fluid stored in the hydraulic fluid tank 48 and then delivers the hydraulic fluid to the control valve CV. For convenience, FIG. 2 illustrates the one actuation hydraulic pump P1. However, without limitation, an appropriate number of actuation hydraulic pumps P1 may be provided so as to supply the hydraulic fluid to each of the hydraulic actuators C1 to C5, ML, MR, and MT.

The control hydraulic pump P2 sucks the hydraulic fluid stored in the hydraulic fluid tank 48 and then delivers the hydraulic fluid to output a hydraulic pressure for signals, control, or the like. That is, the control hydraulic pump P2 supplies (delivers) a pilot fluid. An appropriate number of control hydraulic pumps P2 may be provided too.

The control valve CV includes a plurality of control valves V1 to V8. Each of the control valves V1 to V8 controls (adjusts) the flow rate of the hydraulic fluid to be output from the hydraulic pumps P1 and P2 to each of the hydraulic actuators C1 to C5, ML, MR, and MT.

Specifically, the swing control valve V1 controls the flow rate of the hydraulic fluid to be supplied to the swing cylinder C1. The boom control valve V2 controls the flow rate of the hydraulic fluid to be supplied to the boom cylinder C2. The arm control valve V3 controls the flow rate of the hydraulic fluid to be supplied to the arm cylinder C3. The bucket control valve V4 controls the flow rate of the hydraulic fluid to be supplied to the bucket cylinder C4. The dozer control valve V5 controls the flow rate of the hydraulic fluid to be supplied to the dozer cylinder C5. The left traveling control valve V6 controls the flow rate of the hydraulic fluid to be supplied to the left traveling motor ML. The right traveling control valve V7 controls the flow rate of the hydraulic fluid to be supplied to the right traveling motor MR. The swivel control valve V8 controls the flow rate of the hydraulic fluid to be supplied to the swivel motor MT.

The operation valves (remote control valves) PV1 to PV6 are actuated in response to the operation of the operation levers 5*a* and 5*b* (FIG. 1) included in the operation device 5. The pilot fluid acts on each of the control valves V1 to V8 in proportion to the actuating amount (operating amount) of each of the operation valves PV1 to PV6, causing a spool of each of the control valves V1 to V8 to move linearly. Then, the hydraulic fluid is supplied to the hydraulic actuators C1 to C5, ML, MR, and MT to be controlled, at a flow rate proportional to the amount of movement of the spool of each of the control valves V1 to V8. Furthermore, the hydraulic actuators C1 to C5, ML, MR, and MT are driven according to the amount of hydraulic fluid supplied from the control valves V1 to V8.

In other words, when the operation levers 5*a* and 5*b* are operated, the hydraulic fluid (pilot fluid) acting on the control valves V1 to V8 is adjusted, and the control valves V1 to V8 are controlled. Then, the flow rate of the hydraulic fluid supplied from the control valves V1 to V8 to the hydraulic actuators C1 to C5, ML, MR, and MT is adjusted, and the driving and stopping of the hydraulic actuators C1 to C5, ML, MR, and MT are controlled.

The fluid passage 50 preferably includes, for example, a hose or a pipe made of a material such as metal. The fluid passage 50 is a flow passage that connects each unit provided in the hydraulic circuit K and allows the hydraulic fluid or pilot fluid to flow to each unit. The fluid passage 50 includes a first fluid passage 51, a second fluid passage 52, a first suction fluid passage 54, a second suction fluid passage 55, and a restriction fluid passage 57.

The first suction fluid passage 54 is a flow passage through which the hydraulic fluid sucked from the hydraulic fluid tank 48 by the actuation hydraulic pump P1 flows. The second suction fluid passage 55 is a flow passage through which the hydraulic fluid sucked from the hydraulic fluid tank 48 by the control hydraulic pump P2 flows. The first fluid passage 51 is a flow passage through which the hydraulic fluid delivered from the actuation hydraulic pump P1 flows toward the control valves V1 to V8 of the control valve CV. The first fluid passage 51 branches into a plurality of passages within the control valve CV and is connected to each of the control valves V1 to V8. The second fluid passage 52 is a flow passage through which the hydraulic fluid that has passed through the control valves V1 to V8 flows toward the hydraulic fluid tank 48. The hydraulic fluid tank 48 stores the hydraulic fluid. The second fluid passage 52 includes at least one reciprocating fluid passage 52*a* and a drain fluid passage 52*b*.

A plurality of reciprocating fluid passages 52*a* are provided so as to connect each of the control valves V1 to V8 to a corresponding one of the hydraulic actuators C1 to C5, ML, MR, and MT to be controlled. The reciprocating fluid passage 52*a* is a flow passage that supplies the hydraulic fluid from the connected control valves V1 to V8 to the hydraulic actuators C1 to C5, ML, MR, and MT and returns the hydraulic fluid from the hydraulic actuators C1 to C5, ML, MR, and MT to the control valves V1 to V8. One end of the drain fluid passage 52*b* branches into a plurality of passages connected to the respective control valves V1 to V8. The other end of the drain fluid passage 52*b* is connected to the hydraulic fluid tank 48.

A portion of the hydraulic fluid that flows through the first fluid passage 51 to any one of the control valves V1 to V8 passes through the one of the control valves V1 to V8 and one side of the reciprocating fluid passage 52*a* and is supplied to any one of the hydraulic actuators C1 to C5, ML, MR, and MT to be controlled. Then, the hydraulic fluid delivered from the one of the hydraulic actuators C1 to C5, ML, MR, and MT returns to the connected one of the control valves V1 to V8 through the other side of the reciprocating fluid passage 52*a*, passes through the one of the control valves V1 to V8, and flows into the drain fluid passage 52*b*.

In addition, another portion of the hydraulic fluid that flows through the first fluid passage 51 to any one of the control valves V1 to V8 passes through the one of the control valves V1 to V8 and flows into the drain fluid passage 52*b* without being supplied to the hydraulic actuators C1 to C5, ML, MR, and MT. The drain fluid passage 52*b* is provided with the oil cooler 37. The oil cooler 37 cools the hydraulic fluid that flows from any one of the control valves V1 to V8 through the drain fluid passage 52*b*.

The hydraulic fluid cooled in the oil cooler 37 returns to the hydraulic fluid tank 48 through the drain fluid passage 52*b*. As described above, the fluid passages 54, 51, and 52 are arranged to circulate the hydraulic fluid to the hydraulic fluid tank 48, the hydraulic pump P1, and the control valves V1 to V8 of the control valve CV (part of the hydraulic fluid is also circulated to the hydraulic actuators C1 to C5, ML, MR, and MT).

The restriction fluid passage 57 is a flow passage through which the hydraulic fluid delivered by the control hydraulic pump P2 flows to the operation valves PV1 to PV6. One end of the restriction fluid passage 57 is connected to the control hydraulic pump P2, and the other end thereof is branched into a plurality of passages connected to the primary ports (primary ports) of the respective operation valves PV1 to PV6.

The restriction fluid passage 57 is provided with the unload valve 58, which is a two-position switching solenoid valve. The unload valve 58 switches between a first position 58*a* and a second position 58*b* in response to the operation of the unload lever 5*c* (FIG. 1). When the unload valve 58 is switched to the first position 58*a*, the hydraulic fluid is supplied from the actuation hydraulic pump P1 to the hydraulic actuators C1 to C5, ML, MR, and MT, permitting the actuation of the hydraulic actuators C1 to C5, ML, MR, and MT, the working device 20, and the traveling device 10. In addition, when the unload valve 58 is switched to the second position 58*b*, the supply of the hydraulic fluid from the actuation hydraulic pump P1 to the hydraulic actuators C1 to C5, ML, MR, and MT is interrupted, not permitting the actuation of the hydraulic actuators C1 to C5, ML, MR, and MT, the working device 20, and the traveling device 10 (actuation prohibited state).

Specifically, when the unload lever 5*c* is operated to be in the load position (first position), the unload valve 58 is switched to the first position (fluid supply position, load position) 58*a* by the controller 7, and the hydraulic fluid delivered from the control hydraulic pump P2 to the restriction fluid passage 57 is supplied to the operation valves PV1 to PV6, making the control valves V1 to V8 operable. This also makes it possible to operate the hydraulic actuators C1 to C5, ML, MR, and MT, the working device 20, and the traveling device 10, and the actuation of these units C1 to C5, ML, MR, MT, 20, and 10 is permitted. The hydraulic fluid delivered from the operation valves PV1 to PV6 returns to the hydraulic fluid tank 48 through a separate drain fluid passage (not illustrated).

In addition, when the unload lever 5*c* is operated to be in the unload position (second position), the unload valve 58 is switched to the second position (fluid interrupted position, unload position) 58*b* by the controller 7, and the hydraulic fluid delivered from the control hydraulic pump P2 to the restriction fluid passage 57 is not supplied to the operation valves PV1 to PV6, making the control valves V1 to V8 inoperable (operation prohibited state). This also makes it not possible to operate the hydraulic actuators C1 to C5, ML, MR, and MT, the working device 20, and the traveling device 10, and the actuation of these units C1 to C5, ML, MR, MT, 20, and 10 is not permitted. In addition, the unload valve 58 may be switched to the first position or the second position by the controller 7 regardless of the operating position of the unload lever 5*c*.

In addition to the above, the hydraulic circuit K is provided with an operation detection fluid passage (not illustrated) to detect the operation states of the control valves V1 to V8. The operation detection fluid passage is a fluid passage that returns the pilot fluid delivered from the control hydraulic pump P2 to the hydraulic fluid tank 48 via a plurality of switching valves to switch the positions of the control valves V1 to V8. In the operation detection fluid passage, the AI-SW 45 (FIG. 1) is connected upstream of the control valve V1, which is disposed closest to the control hydraulic pump P2.

When any one of the control valves V1 to V8 is operated from the neutral position to the switching position, a portion of the operation detection fluid passage is blocked, the pressure of the pilot fluid in the operation detection fluid passage increases to a certain degree (a so-called pressurized state), and the AI-SW 45 is turned on. That is, the AI-SW 45 detects the actuation of at least one of the working devices

20 and 10. In addition, when all of the control valves V1 to V8 are in the neutral position, the above operation detection fluid passage is open, so that the pressure of the pilot fluid in the operation detection fluid passage does not increase to a certain degree (a so-called not-pressurized state), and the AI-SW 45 is turned off. That is, the A1-SW 45 detects no actuation of the working devices 20 and 10.

Figure 3B:
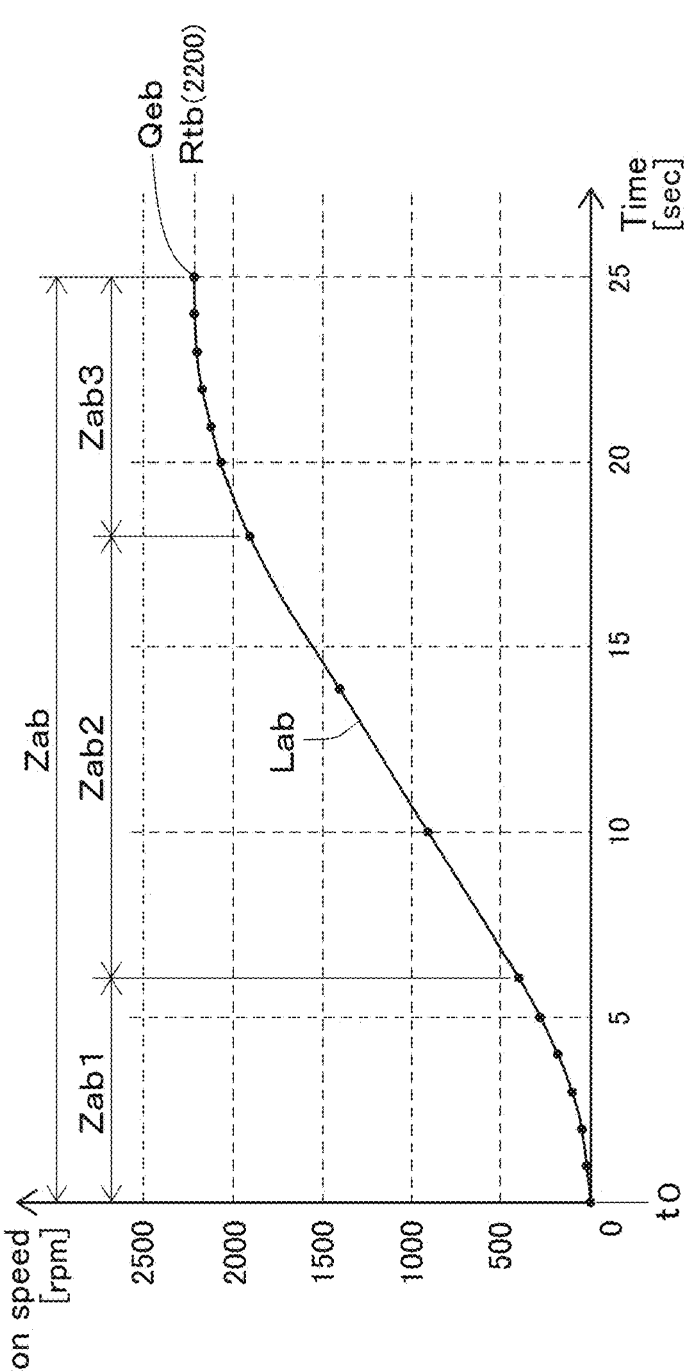
FIG. 3B is a graph illustrating an example of the basic control data for the rotation speed of the electric motor.
Figure 4:
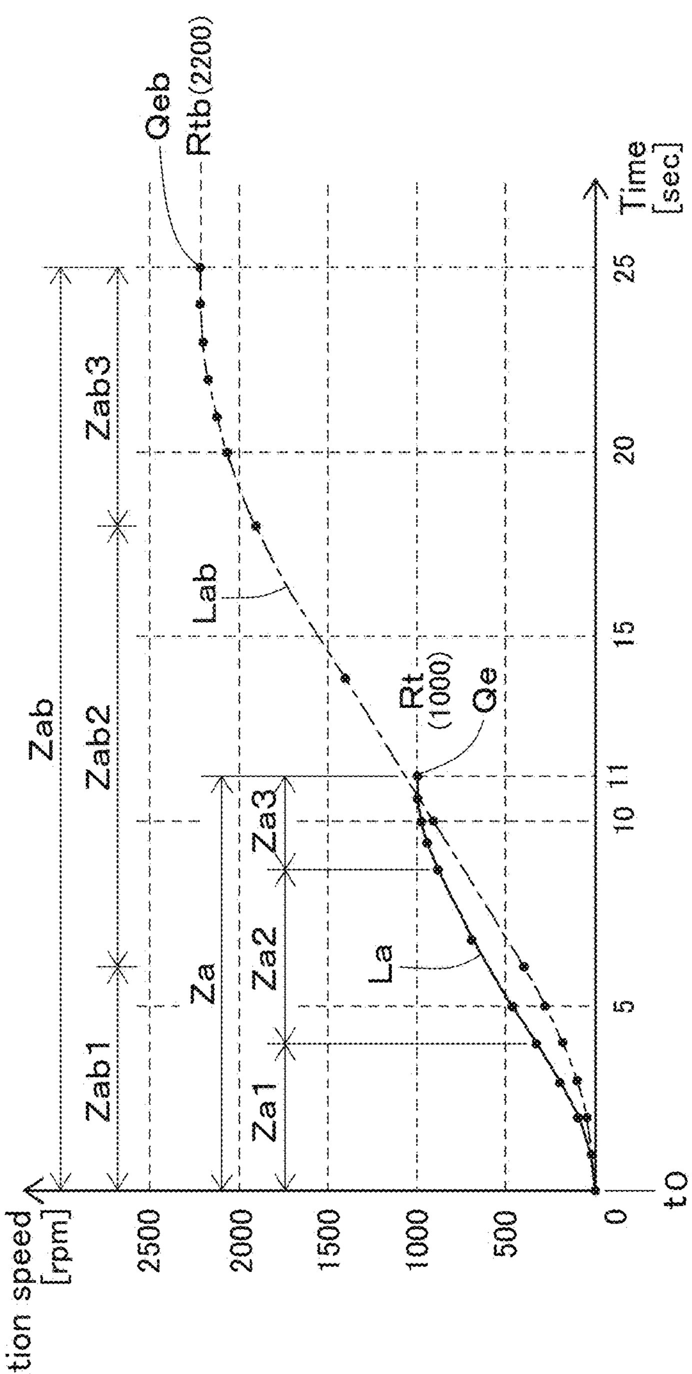
FIG. 4 is a graph illustrating an example of the basic control data and control data for the rotation speed of the electric motor.
Figure 5:
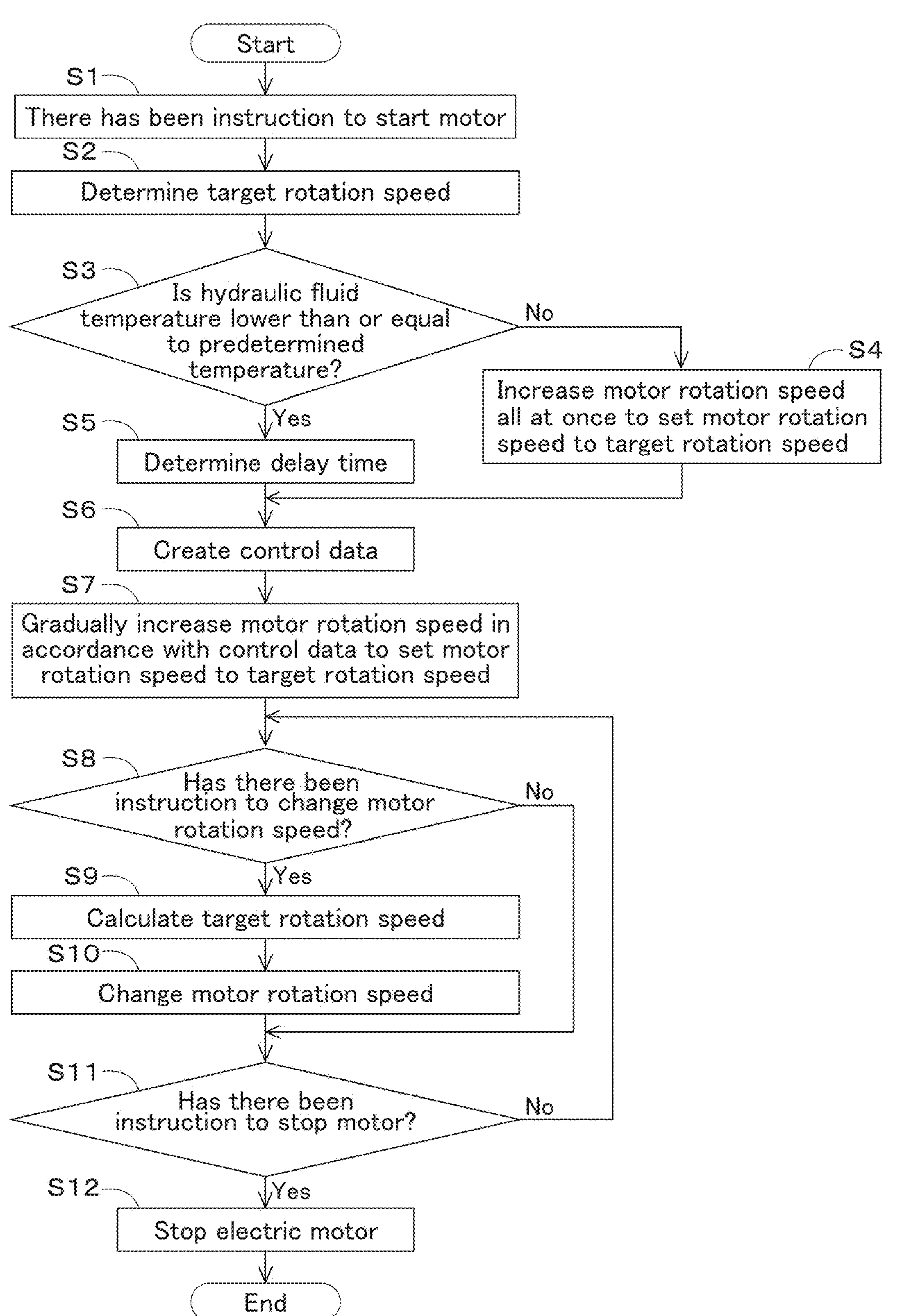
FIG. 5 is a flowchart illustrating an example of control operations of the rotation speed of the electric motor.

Next, the operation of the electric working machine 1 will be described. FIG. 3A is a table illustrating an example of basic control data Lab for the rotation speed of the electric motor 9. FIG. 3B is a graph illustrating an example of the basic control data Lab for the rotation speed of the electric motor 9. FIG. 4 is a graph illustrating an example of the basic control data Lab and control data La for the rotation speed of the electric motor 9. FIG. 5 is a flowchart illustrating an example of control operations of the rotation speed of the electric motor 9 in the electric working machine 1.

The basic control data Lab illustrated in FIGS. 3A to 4 is stored in advance in the storage 7*b* of the controller 7. The storage 7*b* is an example of the "storage" included in example embodiments of the present invention. The series of control operations illustrated in FIG. 5 are executed by the CPU 7*a* of the controller 7, based on a software program and the basic control data Lab stored in advance in the storage 7*b*. Hereinafter, for convenience, the rotation speed of the electric motor 9 will be referred to as the "motor rotation speed."

The basic control data Lab illustrated in FIGS. 3A, 3B, and the like is control data indicating a change in the motor rotation speed when the electric motor 9 is started in a state in which the hydraulic fluid temperature is lower than or equal to a predetermined temperature (for example, −10° C.), to gradually increase the motor rotation speed from 0 rpm to a predetermined basic target rotation speed (for example, 2200 rpm) Rtb over a predetermined basic delay time (for example, 25 seconds) Zab. In addition, FIGS. 3A and 3B illustrate a correlation between the elapsed time from when the motor rotation speed starts to be increased and the control value for the motor rotation speed. Moreover, as illustrated in FIG. 3B, the basic control data Lab is data having a curve.

The basic target rotation speed (for example, 2200 rpm) Rtb is the maximum rotation speed that can be set for the electric motor 9. The basic delay time (for example, 25 seconds) Zab is the time from when the motor rotation speed starts to be increased until when the motor rotation speed is set to the basic target rotation speed Rtb. For example, in another working machine equipped with a diesel engine as a prime mover, the basic control data Lab is created to match actual measurement data illustrating a change in the rotation speed of the diesel engine when the diesel engine is started in a situation in which the hydraulic fluid temperature is lower than or equal to a predetermined temperature.

As illustrated in FIG. 3B, in the basic control data Lab, the basic delay time (for example, 25 seconds) Zab is divided into three sections: a predetermined immediately-after-start section Zab1, an intermediate section Zab2, and an immediately-before-end section Zab3. During the intermediate section Zab2, the motor rotation speed increases in proportion (substantially in proportion) to the elapsed time from an increase start time point to. In addition, during the immediately-after-start section Zab1 and the immediately-before-end section Zab3, which correspond to sections before and after the intermediate section Zab2, the motor rotation speed increases more gently than during the intermediate section Zab2. Furthermore, the motor rotation speed reaches the basic target rotation speed Rtb (maximum rotation speed 2200 rpm, for example) at "24 seconds" after the start of increase, but in order to stabilize the motor rotation speed at the basic target rotation speed Rtb, the basic delay time Zab is set to "25 seconds", which is longer than "24 seconds", for example. That is, the basic delay time Zab is set to a time during which the electric motor 9 is started and the motor rotation speed can be stabilized at the basic target rotation speed Rtb.

For example, in response to the operator turning on the starter SW 8 (FIG. 1), the controller 7 determines that there has been an instruction to start the electric motor 9 (S1 in FIG. 5) and determines a target rotation speed Rt of the electric motor 9 according to the operating position of the accelerator dial 5*d* (FIG. 1) (S2). In addition, the controller 7 detects the hydraulic fluid temperature with the fluid temperature detector 44, and when the hydraulic fluid temperature is higher than a predetermined temperature (for example, a low temperature such as −10° C.) (S3: NO), the controller 7 supplies electric power to the electric motor 9 by the inverter 38 to start the electric motor 9 and increases the motor rotation speed all at once to set the motor rotation speed to the target rotation speed Rt (S4). This completes the starting of the electric motor 9, and the electric motor 9 enters a driven state. Subsequently, the controller 7 waits for an instruction to change the motor rotation speed while maintaining the motor rotation speed at the target rotation speed Rt.

On the other hand, when the hydraulic fluid temperature is lower than or equal to the predetermined temperature (S3: YES), the controller 7 determines a delay time Za until the motor rotation speed is set to the target rotation speed Rt, based on the basic control data Lab and the target rotation speed Rt stored in the storage 7*b* (S5). In addition, the controller 7 creates the control data La indicating a change in the motor rotation speed, for setting the motor rotation speed to the target rotation speed Rt over the delay time Za (S6).

For example, when the target rotation speed Rt is equal to the basic target rotation speed Rtb, the controller 7 determines the basic delay time Zab (FIG. 3B or the like) as the delay time Za (S5 in FIG. 5) and creates (determines) the basic control data Lab as the control data La (S6).

On the other hand, when the target rotation speed Rt is different from the basic target rotation speed Rtb, that is, when the target rotation speed Rt is lower than the basic target rotation speed Rtb, the controller 7 determines the delay time Za based on, for example, the basic control data Lab and the difference between the basic target rotation speed Rtb and the target rotation speed Rt (S5) and creates the control data La (S6).

Specifically, for example, when the controller 7 determines the target rotation speed Rt to be "1000 rpm" according to the operating position of the accelerator dial 5*d*, assuming a case in which the rotation speed of the electric motor 9 is changed based on the basic control data Lab illustrated in FIGS. 3A to 4, and the controller 7 determines the elapsed time "11 seconds" until the motor rotation speed reaches "1000 rpm" as the delay time Za (S5 in FIG. 5).

In addition, the controller 7 creates the control data La by correcting the basic control data Lab to be reduced according to the difference between the basic target rotation speed (for example, 2200 rpm) Rtb and the target rotation speed (for example, 1000 rpm) Rt and the delay time (11 seconds) Za (S6 in FIG. 5). More specifically, as illustrated in FIG. 4 or the like, the basic control data Lab includes a basic end point Qeb at which the elapsed time is the basic delay time Lab and the rotation speed of the electric motor 9 is the basic target rotation speed Rtb. The controller 7 creates the control data La by correcting the basic control data Lab to be reduced such that the basic end point Qeb coincides with a target end point Qe at which the elapsed time is the delay time Za and the rotation speed of the electric motor 9 is the target rotation speed Rt. When another target rotation speed Rt is determined according to the operating position of the accelerator dial 5*d*, the delay time Za is determined and the control data La is created in the same manner as described above.

As illustrated in FIG. 4, also in the control data La, the delay time Za is divided into three sections: a predetermined immediately-after-start section Za1, an intermediate section Za2, and an immediately-before-end section Za3. During the intermediate section Za2, the motor rotation speed increases in proportion to the elapsed time from the increase start time point to. In addition, during the immediately-after-start section Za1 and the immediately-before-end section Za3, the rotation speed of the electric motor 9 increases more gently than during the intermediate section Za2. Furthermore, the motor rotation speed reaches the target rotation speed Rt at about "10.5 seconds" after the start of increase, but in order to stabilize the motor rotation speed at the target rotation speed Rt, the delay time Za is set to "11 seconds", which is longer than "10.5 seconds", for example. That is, the delay time Za is set to a time during which the electric motor 9 is started and the motor rotation speed can be stabilized at the target rotation speed Rt.

Subsequently, the controller 7 adjusts the magnitude of electric power (e.g., current) supplied to the electric motor 9 by the inverter 38 in accordance with the control data La and gradually increases the motor rotation speed to set the motor rotation speed to the target rotation speed Rt over the delay time Za (S7 in FIG. 5). At this time, the controller 7 counts the elapsed time from the start of increase in the motor rotation speed, compares the actual rotation speed of the electric motor 9 detected by the rotation speed detector 42 with the control value for the motor rotation speed indicated by the control data La at a predetermined timing, and controls the motor rotation speed by the inverter 38 so as to bring the actual rotation speed closer to the control value. Also, at this time, the controller 7 may control the motor rotation speed by the inverter 38 such that the actual rotation speed of the electric motor 9 becomes lower than or equal to the control value.

Each of the points illustrated on the control data La and Lab in FIG. 3B and FIG. 4 represents the predetermined timing at which the controller 7 compares the actual rotation speed of the electric motor 9 with the control value for the motor rotation speed. In the immediately-after-start sections Za1 and Zab1 and the immediately-before-end sections Za3 and Zab3 in the delay times Za and Zab, there are more comparison timings and the intervals between the comparison timings are shorter than in the intermediate sections Za2 and Zab2. That is, the number of times the controller 7 compares the actual rotation speed of the electric motor 9 with the control value for the motor rotation speed is larger in the immediately-after-start sections Za1 and Zab1 and the immediately-before-end sections Za3 and Zab3 than in the intermediate sections Za2 and Zab2.

When the motor rotation speed is set to the target rotation speed Rt over the delay time Za (S7 in FIG. 5), the starting of the electric motor 9 is completed, and the electric motor 9 is in the driven state. Subsequently, the controller 7 waits for an instruction to change the motor rotation speed while maintaining the motor rotation speed at the target rotation speed Rt.

For example, in response to the operator operating the accelerator dial 5*d* while the electric motor 9 is being driven, the controller 7 determines that there has been an instruction to change the motor rotation speed (S8 in FIG. 5: YES) and calculates the target rotation speed Rt according to the operating position of the accelerator dial 5*d* (S9). Then, the controller 7 adjusts electric power to be supplied to the electric motor 9 by the inverter 38 to change the motor rotation speed to coincide with the target rotation speed Rt (S10).

Subsequently, when there is no instruction to stop the electric motor 9 (S11: NO), the controller 7 proceeds to S8 and waits again for an instruction to change the motor rotation speed. In addition, for example, in response to the operator turning off the starter SW 8, the controller 7 determines that there has been an instruction to stop the electric motor 9 (S11: YES) and interrupts the electric power supply to the electric motor 9 by the inverter 38, thereby stopping the electric motor 9 (S12).

The example embodiment illustrated in FIG. 5 illustrates an example in which, when the electric motor 9 is started in a state in which the hydraulic fluid temperature is lower than or equal to the predetermined temperature, the motor rotation speed is gradually increased to set the motor rotation speed to the target rotation speed Rt over the delay time Za. However, example embodiments of the present invention are not limited to this. For example, also when the motor rotation speed is changed to a higher rotation speed by the operation of the accelerator dial 5*d* in a state in which the electric motor 9 is being driven and the hydraulic fluid temperature is lower than or equal to the predetermined temperature, the controller 7 may calculate the target rotation speed according to the operating position of the accelerator dial 5*d*, determine the delay time, and create the control data indicating a change in the motor rotation speed. The controller 7 may then gradually increase the motor rotation speed in accordance with the control data to set the motor rotation speed to the target rotation speed.

In addition, while S7 in FIG. 5 is being executed, that is, while the motor rotation speed is gradually increased, the operator may be notified that it will take time (delay time Za) to start the electric motor 9, or the target rotation speed Rt may be changed by accepting the operation of the accelerator dial 5*d*. These example embodiments are illustrated in FIG. 6.

FIG. 6 is a flowchart illustrating an example of details of S7 in FIG. 5. After S1 to S3, S5, and S6 in FIG. 5, in S7, the controller 7 starts to gradually increase the motor rotation speed by the inverter 38 in accordance with the control data La (S21 in FIG. 6) and then causes the display 43 to display a notification indicating that the electric motor 9 is being started (motor starting notification) (S22). As the motor starting notification, the controller 7 causes the display 43 to display a message such as "Motor starting" or "Motor output limited". Alternatively, the controller 7 may cause the display 43 to display the delay time Za and the elapsed time from the start of gradual increase in the motor rotation speed, or may cause the display 43 to display the ratio (%) of the elapsed time to the delay time Za.

Then, when there is no instruction to change the motor rotation speed (S23: NO), and the delay time Za has not elapsed or the actual rotation speed of the electric motor 9 detected by the rotation speed detector 42 has not reached the target rotation speed Rt (S24: NO), the controller 7 checks whether the elapsed time since the start of gradual increase in the motor rotation speed has exceeded the immediately-after-start section Za1.

When the elapsed time has not exceeded the immediately-after-start section Za1 (S25: NO, elapsed time<immediately-after-start section Za1), the controller 7 switches the unload valve 58 (FIG. 2) to the second position 58*b* to prohibit the actuation of the working devices 20 and 10 (S26 in FIG. 6). As a result, even when the operator operates the operation interfaces 5*a* and 5*b* (FIG. 1), the operation is not accepted, and the working devices 20 and 10 are not actuated. On the other hand, when the elapsed time has exceeded the immediately-after-start section Za1 (S25: YES, elapsed time≥immediately-after-start section Za1), the controller 7 switches the unload valve 58 to the first position 58*a* to permit the actuation of the working devices 20 and 10 (S27). As a result, when the operator operates either of the operation interfaces 5*a* and 5*b*, the operation is accepted, and the working devices 20 and 10 are actuated according to the operation.

On the other hand, for example, in response to the operator operating the accelerator dial 5*d* while the motor rotation speed is gradually increasing, the controller 7 determines that there has been an instruction to change the motor rotation speed (S23: YES) and determines a new target rotation speed Rt according to the operating position of the accelerator dial 5*d* (S28). Then, when the new target rotation speed Rt is higher than or equal to the actual rotation speed of the electric motor 9 currently detected by the rotation speed detector 42 (S29: NO), the controller 7 discards the new target rotation speed Rt and continues to gradually increase the motor rotation speed in accordance with the control data La (S30). That is, the target rotation speed Rt calculated in S2 in FIG. 5, the delay time Za determined in S5, and the control data La created in S6 are each retained, and the gradual increase in the motor rotation speed is continued in accordance with the control data La.

On the other hand, when the new target rotation speed Rt is lower than the actual rotation speed of the electric motor 9 (S29: YES), the controller 7 temporarily suspends the gradual increase in the motor rotation speed that has been executed (S31). Then, the controller 7 changes the delay time Za according to the new target rotation speed Rt (S32) and changes the control data La according to the new target rotation speed Rt and the changed delay time Za (S33). At this time, the changed delay time Za is shorter than the delay time Za before the change. In addition, the control data La is changed only for the section from the time point the gradual increase in the motor rotation speed is suspended (S31) to the end time point of the changed delay time Za. Then, the controller 7 resumes the gradual increase in the motor rotation speed in accordance with the changed control data La (S34).

Subsequently, when there is no instruction to change the motor rotation speed (S23: NO), and the delay time Za has elapsed and the actual rotation speed of the electric motor 9 has reached the target rotation speed Rt (S24: YES), the controller 7 stops the gradual increase in the motor rotation speed by the inverter 38 and maintains the motor rotation speed at the target rotation speed Rt (S35). This completes the starting of the electric motor 9, and the electric motor 9 enters the driven state. In addition, the controller 7 stops (turns off) the display of the motor starting notification on the display 43 (S36). Subsequently, the controller 7 transitions to S8 in FIG. 5 while maintaining the motor rotation speed at the target rotation speed Rt and waits for an instruction to change the motor rotation speed.

As another example, instead of S24 in FIG. 6, only one of the conditions that the delay time Za has elapsed and that the actual rotation speed of the electric motor 9 has reached the target rotation speed Rt may be adopted, and when the adopted condition is not satisfied, the determination S25 may be executed, and when the adopted condition is satisfied, S35 may be executed.

The numerical values of the predetermined temperature, the delay times Za and Zab, the target rotation speeds Rt and Rtb, and the elapsed time and the motor rotation speed in the control data La and Lab illustrated in the above example embodiment are examples and are not limited to these numerical values. In addition, the number and intervals of timings of comparing the control value in the control data La and Lab illustrated in FIG. 4 or the like and the actual rotation speed of the electric motor 9 may be reduced as the delay time Za is shortened.

The above example embodiment has illustrated an example in which the controller 7 starts and stops the electric motor 9 according to the turning on/off of the starter SW 8 and calculates the target rotation speed Rt of the electric motor 9 according to the operating position of the accelerator dial 5*d*. However, example embodiments of the present invention are not limited to these. For example, the controller 7 may start and stop the electric motor 9 and set the target rotation speed of the electric motor 9 according to a command from a remote controller. Alternatively, the target rotation speed of the electric motor 9 at the time of starting may be set to a preset rotation speed.

The above example embodiments have illustrated an example in which the basic target rotation speed Rtb and the basic delay time Zab in the basic control data Lab are set to their maximum values. However, without limitation to this, the basic target rotation speed Rtb may be set to a predetermined rotation speed that is lower than the maximum rotation speed at which the electric motor 9 can rotate, or the delay time Za may be set to a predetermined time that is shorter than the maximum time in the range in which the delay time Za can be set. Furthermore, in these cases, the basic control data Lab may be corrected to be reduced or enlarged according to the difference between the basic target rotation speed Rtb and the target rotation speed Rt to generate the control data La.

The above example embodiments have illustrated the only one piece of basic control data Lab. However, for example, temperatures lower than or equal to a predetermined temperature (for example, −10° C.) may be divided into a plurality of temperature ranges, and basic control data corresponding to each temperature range may be preset and stored in the storage 7*b*, so that the controller 7 adopts the basic control data corresponding to the temperature range to which the hydraulic fluid temperature belongs. In this case, for example, a plurality of pieces of basic control data may be preset so that the basic delay time is longer in a lower temperature range than in a higher temperature range. In addition, the basic control data may be stored in advance in a storage other than the storage 7*b* of the controller 7.

In addition, for example, a plurality of target rotation speeds of the electric motor 9 that can be specified by operating the accelerator dial 5*d* may be provided, and a plurality of pieces of control data may be stored in advance in the storage 7*b* so as to correspond to the respective plurality of target rotation speeds. An example embodiment of this case will be described with reference to FIGS. 7 and 8.

Figure 7:
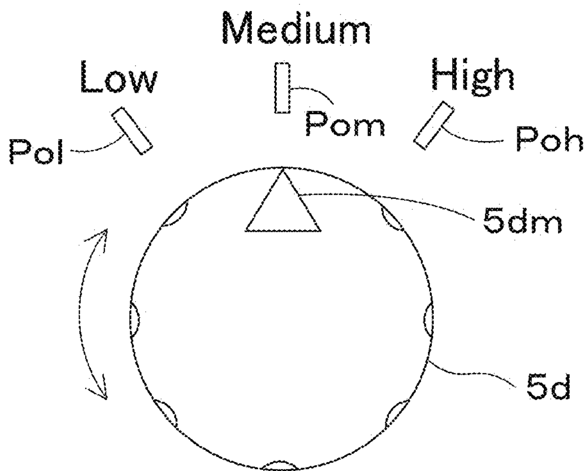
FIG. 7 is a diagram illustrating an example of an accelerator dial.
Figure 8:
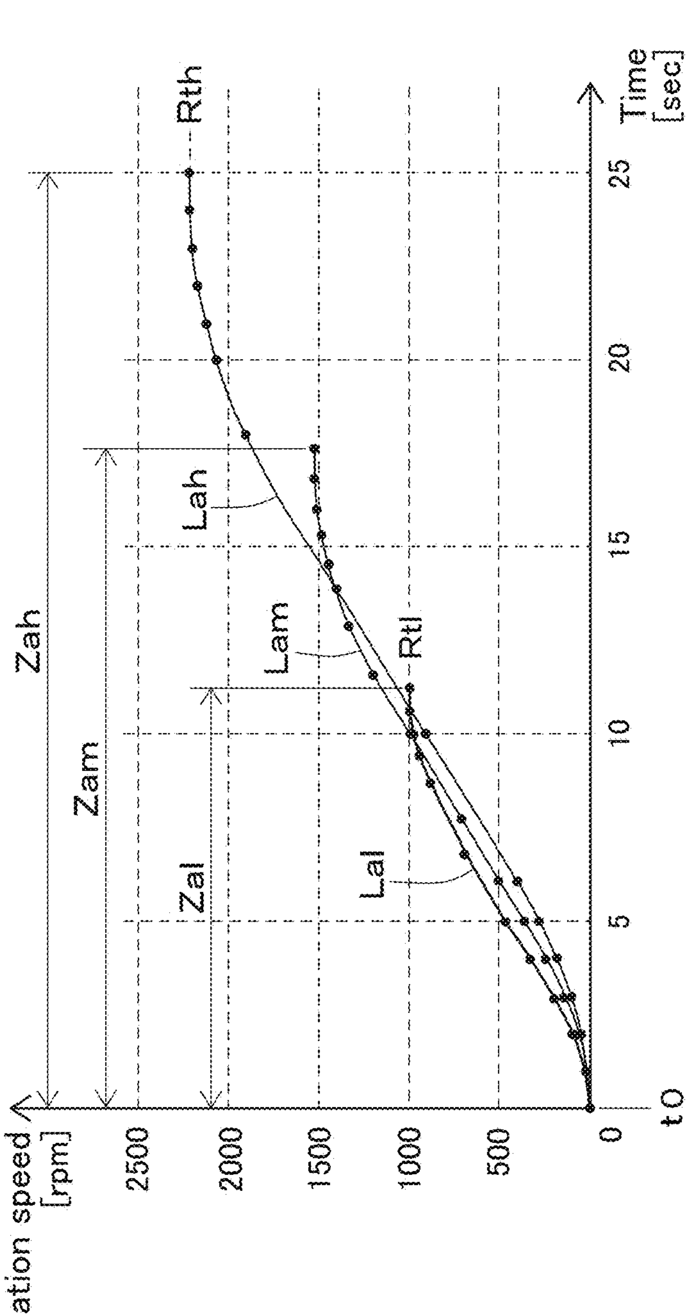
FIG. 8 is a diagram illustrating an example of a plurality of pieces of control data corresponding to a plurality of target rotation speeds of the electric motor.

FIG. 7 is a diagram illustrating an example of the accelerator dial 5*d*. FIG. 8 is a diagram illustrating an example of a plurality of pieces of control data corresponding to a plurality of target rotation speeds of the electric motor 9. The accelerator dial 5*d* illustrated in FIG. 7 can be rotated to any one of a low-speed position Pol, a medium-speed position Pom, and a high-speed position Poh. By rotating the accelerator dial 5*d* to align a mark portion 5*dm* with the low-speed position Pol, the medium-speed position Pom, and the high-speed position Poh, it is possible to specify a low target rotation speed Rtl, a medium target rotation speed Rtm, and a high target rotation speed Rth as the target rotation speed Rt of the electric motor 9, respectively. Of the plurality of target rotation speeds Rtl, Rtm, and Rth, the low target rotation speed Rtl is the lowest rotation speed, and the high target rotation speed Rth is the highest rotation speed.

Low control data Lal illustrated in FIG. 8 is control data that indicates a change in the rotation speed of the electric motor 9 for setting the rotation speed of the electric motor 9 to the corresponding low target rotation speed Rtl over a low delay time Zal. Medium control data Lam is control data that indicates a change in the rotation speed of the electric motor 9 for setting the rotation speed of the electric motor 9 to the corresponding medium target rotation speed Rtm over a medium delay time Zam. High control data Lah is control data that indicates a change in the rotation speed of the electric motor 9 for setting the rotation speed of the electric motor 9 to the corresponding high target rotation speed Rth over a high delay time Zah. That is, the low target rotation speed Rtl, the low delay time Zal, and the low control data Lal correspond to each other. In addition, the medium target rotation speed Rtm, the medium delay time Zam, and the medium control data Lam correspond to each other. Furthermore, the high target rotation speed Rth, the high delay time Zah, and the high control data Lah correspond to each other. Of the plurality of delay times Zal, Zam, and Zah, the low delay time Zal is the shortest time, and the high delay time Lah is the longest time.

The storage 7*b* of the controller 7 stores in advance the delay times Zal, Zam, and Zah and the control data Lal, Lam, and Lah corresponding to the plurality of target rotation speeds Rtl, Rtm, and Rth. When starting the electric motor 9 in a state in which the hydraulic fluid temperature is lower than or equal to a predetermined temperature, the controller 7 reads, from the storage 7*b*, any one of the delay times Zal, Zam, and Zah and any one of the control data Lal, Lam, and Lah corresponding to any one target rotation speed specified by the accelerator dial 5*d* among the target rotation speeds Rtl, Rtm, and Rth, and based on the delay time and the control data, controls the rotation speed of the electric motor 9.

Note that the above description has illustrated an example in which three target rotation speeds that can be specified by the accelerator dial 5*d* are provided and three delay times and pieces of control data are provided to correspond to the three target rotation speeds. However, two, or four or more target rotation speeds, delay times, and pieces of control data may also be provided. In addition, the number of target rotation speeds that can be specified by the accelerator dial 5*d* may be different from the number of delay times and the number of pieces of control data. For example, the number of target rotation speeds that can be specified by the accelerator dial 5*d* may be N, and the number of delay times and pieces of control data may be M, which is less than N, and the controller 7 may determine, according to the magnitude of the target rotation speed specified by the accelerator dial 5*d*, the target rotation speed among the N target rotation speeds and determine the delay time and the control data corresponding to the target rotation speed.

The above example embodiments have illustrated examples in which the accelerator dial 5*d* is used as the specifier and the work operation lever 5*a* and the travel operation lever 5*b* are used as the work operation interfaces. However, example embodiments of the present invention are not limited to these. For example, various operation interfaces such as a push button, a slide switch, a tumbler switch, a lever, a joystick, a dial, and a key may be used as the work operation interface and the specifier.

An electric working machine 1 of the present example embodiment has the following configuration and provides the following effects.

An electric working machine 1 of the present example embodiment includes a battery 30, an electric motor 9, an inverter 38 to supply the electric power of the battery 30 to the electric motor 9 to drive the electric motor 9, at least one hydraulic pump P1 or P2 to be actuated by the power of the electric motor 9, at least one hydraulic device (at least one of hydraulic motors ML, MR, and MT, at least one of hydraulic cylinders C1 to C5, or/and control valve CV) to be actuated by a hydraulic pressure of a hydraulic fluid delivered from the at least one hydraulic pump P1 or P2, a fluid temperature detector 44 to detect a temperature of the hydraulic fluid, a rotation speed detector 42 to detect a rotation speed of the electric motor 9, and a controller 7 configured or programmed to control driving of the inverter 38 and the electric motor 9. The controller 7 is configured or programmed to gradually increase the rotation speed of the electric motor 9 to be set to a target rotation speed Rt such that the rotation speed of the electric motor 9 reaches the target rotation speed Rt in a longer time when the electric motor 9 is started in a state in which the temperature of the hydraulic fluid detected by the fluid temperature detector 44 is lower than or equal to a predetermined temperature than when the electric motor 9 is started in a state in which the temperature of the hydraulic fluid is higher than the predetermined temperature.

According to the above configuration, when the electric motor 9 is started in a state in which the temperature of the hydraulic fluid is low, which is lower than or equal to the predetermined temperature, the rotation speed of the electric motor 9 gradually increases, rather than increasing all at once, to the target rotation speed Rt. That is, when the electric motor 9 is started in a state in which the hydraulic fluid temperature is low, the time from the start of starting the electric motor 9 to the completion of starting (delay time Za) is intentionally delayed. Accordingly, the hydraulic pumps P1 and P2 are not actuated suddenly, the suction negative pressure does not increase, and cavitation in the hydraulic fluid in the hydraulic pumps P1 and P2 can be reduced or prevented. As a result, wear and shortening of the service life of the hydraulic pumps P1 and P2 due to cavitation can be prevented.

In the present example embodiment, the electric working machine 1 includes a specifier (for example, an accelerator dial) 5*d* to be operated to specify the rotation speed of the electric motor 9. When the electric motor 9 is started in a state in which the temperature of the hydraulic fluid is lower than or equal to the predetermined temperature, the controller 7 is configured or programmed to determine the delay time Za, the delay time Za being a time until the rotation speed of the electric motor 9 is stabilized at the target rotation speed Rt, the target rotation speed Rt being the rotation speed specified by the specifier 5*d*, and gradually increase the rotation speed of the electric motor 9 such that the rotation speed of the electric motor 9 is stabilized at the target rotation speed Rt after the delay time Za has elapsed from when the rotation speed of the electric motor 9 starts to be increased. Accordingly, when the electric motor 9 is started in a state in which the temperature of the hydraulic fluid is low and the rotation speed of the electric motor 9 is set to the target rotation speed Rt according to the operating position of the specifier 5*d*, the delay time Za and the control data La are set according to the target rotation speed Rt, and the rotation speed of the electric motor 9 is appropriately and gradually increased, thus reducing or preventing cavitation.

In the present example embodiment, the controller 7 is configured or programmed to calculate the target rotation speed Rt according to an operating position of the specifier 5*d*. Accordingly, the operator can operate the specifier 5*d* to freely set the target rotation speed Rt of the electric motor 9 at the time of starting. In addition, even in a state in which the temperature of the hydraulic fluid is low, when the electric motor 9 is started, the rotation speed of the electric motor 9 can be set to the target rotation speed Rt desired by the operator while reducing or preventing cavitation.

In the present example embodiment, the electric working machine 1 includes a storage 7*b* to store in advance the basic control data Lab indicating a change in the rotation speed of the electric motor 9 to stabilize the rotation speed of the electric motor 9 at a predetermined basic target rotation speed Rtb over a predetermined basic delay time Zab. The controller 7 is configured or programmed to determine, as the delay time Za, a time until the rotation speed of the electric motor 9 reaches the target rotation speed Rt when the rotation speed of the electric motor 9 is changed based on the basic control data Lab. Accordingly, the delay time Za adopted to the target rotation speed Rt according to the operating position of the specifier 5*d* can be easily set by using the basic delay time Zab, the basic target rotation speed Rtb, and the basic control data Lab as models.

In the present example embodiment, the basic control data Lab is data including a curve indicating a correlation between the rotation speed of the electric motor 9 and an elapsed time from an increase start time point to of the rotation speed of the electric motor 9 and includes a basic end point Qeb at which the elapsed time is the basic delay time Lab and the rotation speed of the electric motor 9 is the basic target rotation speed Rtb. The controller 7 is configured or programmed to correct the basic control data Lab such that the basic end point Qeb coincides with a target end point Qe at which the elapsed time is the delay time Za and the rotation speed of the electric motor 9 is the target rotation speed Rt so as to create the control data La indicating a change in the rotation speed of the electric motor 9 to stabilize the rotation speed of the electric motor 9 at the target rotation speed Rt over the delay time Za and to control the rotation speed of the electric motor 9 based on the control data La. Thus, the delay time Za is determined based on the basic control data Lab and the target rotation speed Rt, and the control data La is created. Accordingly, the control data La for setting the rotation speed of the electric motor 9 to the target rotation speed Rt can be easily set over the delay time Za by using the basic control data Lab as a model, and the rotation speed of the electric motor 9 can be appropriately and gradually increased based on the control data La.

In the present example embodiment, the basic target rotation speed Rtb is set to a predetermined maximum rotation speed that is settable for the electric motor 9. The controller 7 is configured or programmed to create the control data La by correcting the basic control data Lab to be reduced such that the basic end point Qeb coincides with the target end point Qe. Accordingly, the control data La corresponding to the delay time Za and the target rotation speed Rt can be easily set by using the basic control data Lab as a maximum model.

In the present example embodiment, the specifier 5*d* is operable to specify the predetermined plurality of target rotation speeds Rtl, Rtm, and Rth. The electric working machine 1 includes a storage 7*b* to store in advance, for each of the plurality of target rotation speeds Rtl, Rtm, and Rth, the corresponding delay times Zal, Za, and Zah and the control data Lal, Lam, and Lah indicating a change in the rotation speed of the electric motor 9 to stabilize the rotation speed of the electric motor 9 at the corresponding target rotation speeds Rtl, Rtm, and Rth over the corresponding delay times Zal, Za, and Zah. The controller 7 is configured or programmed to control the rotation speed of the electric motor 9 based on the control data Lal, Lam, and Lah corresponding to any target rotation speed of the target rotation speeds Rtl, Rtm, and Rth, the target rotation speed being specified by the specifier 5*d*. Accordingly, when the electric motor 9 is started in a state in which the temperature of the hydraulic fluid is low and the rotation speed of the electric motor 9 is set to any one of the target rotation speeds Rtl, Rtm, and Rth according to the operating position of the specifier 5*d*, the rotation speed of the electric motor 9 can be appropriately and gradually increased by using the control data Lal, Lam, or Lah corresponding to the target rotation speed, thus reducing or preventing cavitation.

In the present example embodiment, the controller 7, when gradually increasing the rotation speed of the electric motor 9 in accordance with the control data La to stabilize the rotation speed of the electric motor at the target rotation speed Rt, is configured or programmed to count an elapsed time from a start of increase in the rotation speed of the electric motor 9, compare an actual rotation speed of the electric motor 9 detected by the rotation speed detector 42 with a control value for the rotation speed of the electric motor 9 indicated by the control data La at each of predetermined timings, and control the rotation speed of the electric motor 9 so as to bring the actual rotation speed closer to the control value. Accordingly, when the electric motor 9 is started in a state in which the temperature of the hydraulic fluid is low, a sudden increase in the actual rotation speed of the electric motor 9 can be prevented, and cavitation in the hydraulic fluid in the hydraulic pumps P1 and P2 can be further reduced or prevented.

In the present example embodiment, among an immediately-after-start section Za1, an intermediate section Za2, and an immediately-before-end section Za3 obtained by dividing a section from an increase start time point to of the rotation speed of the electric motor 9 to the delay time Za, the controller 7 is configured or programmed to create the control data La so as to increase the rotation speed of the electric motor 9 in proportion to an elapsed time from the increase start time point to during the intermediate section Za2 and change the rotation speed of the electric motor 9 more gently during the immediately-after-start section Za1 and the immediately-before-end section Za3 than during the intermediate section Za2. Accordingly, the rotation speed of the electric motor 9 can be prevented from suddenly increasing immediately after the start of increase in the rotation speed of the electric motor 9. In addition, immediately before the end of increase in the rotation speed of the electric motor 9, the rotation speed of the electric motor 9 can be prevented from exceeding the target rotation speed Rt, and the rotation speed of the electric motor 9 can be adjusted to the target rotation speed Rt. Furthermore, since the increase in the rotation speed of the electric motor 9 is greater during the intermediate section Za2 than during the immediately-after-start section Za1 and the immediately-before-end section Za3, the rotation speed of the electric motor 9 can be set to the target rotation speed Rt, thereby preventing the time until the starting of the electric motor 9 is completed (delay time Za) from being unnecessarily long.

In the present example embodiment, the electric working machine 1 includes at least one working device 20 or 10 (working device 20 or/and traveling device 10) to be actuated by power of the at least one hydraulic device (at least one hydraulic motor ML, MR, or MT, at least one of hydraulic cylinders C1 to C5, or/and control valve CV), and at least one operation interface 5*a* or 5*b* (work operation lever 5*a* or/and travel operation lever 5*b*) to operate the actuation of the at least one working device 20 or 10. The controller 7 is configured or programmed to prohibit the actuation of the at least one working device 20 or 10 by the operation of the at least one operation interface 5*a* or 5*b* during the immediately-after-start section Za1. Accordingly, the hydraulic device(s) (hydraulic motor(s) ML, MR, or/and MT, at least one of hydraulic cylinders C1 to C5, or/and control valve CV) or the working device(s) 20 or/and 10 can be prevented from malfunctioning in response to the operation of the operation interface(s) 5*a* or/and 5*b* when the rotation speed of the electric motor 9 is low and the delivery amount of the hydraulic fluid from the hydraulic pump(s) P1 or/and P2 is small.

In the present example embodiment, the controller 7 is configured or programmed to determine a new target rotation speed Rt according to an operating position of the specifier 5*d* upon the operation of the specifier 5*d* when increasing the rotation speed of the electric motor 9 in accordance with the control data La, changes the delay time Za and the control data La according to the new target rotation speed Rt when the new target rotation speed Rt is higher than the actual rotation speed of the electric motor 9 detected by the rotation speed detector 42, and controls the rotation speed of the electric motor 9 in accordance with the changed control data La.

According to the above description, when the new target rotation speed Rt that is higher than the actual rotation speed of the electric motor 9 is specified by the specifier 5*d* while the electric motor 9 is being started in accordance with the control data La in a state in which the temperature of the hydraulic fluid is low, the target rotation speed Rt can be changed to the new target rotation speed Rt, and the rotation speed of the electric motor 9 can be gradually increased to be set to the new target rotation speed Rt. In addition, when the new target rotation speed Rt that is lower than the actual rotation speed of the electric motor 9 is specified by the specifier 5*d*, the new target rotation speed Rt can be ignored, and the rotation speed of the electric motor 9 can continue to be gradually increased in accordance with the control data La, so that the rotation speed of the electric motor 9 can be set to the target rotation speed Rt.

In the present example embodiment, the electric working machine 1 includes a display 43 to display a notification indicating that the electric motor 9 is being started while the rotation speed of the electric motor 9 is gradually increased by the controller 7. Accordingly, the operator can be visually notified that it will take time (delay time Za) for the electric motor 9 to be started.

The above example embodiments have described examples of electric working machines 1 such as backhoes. However, example embodiments of the present invention are not limited to this, and example embodiments of the present invention may be applied to other construction machines such as a wheel loader, a compact track loader, and a skid-steer loader and may be applied to agricultural machines such as a tractor, a combine, a rice transplanter, and a lawn mower.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric working machine comprising:
a battery;
an electric motor;
an inverter to supply electric power from the battery to the electric motor to drive the electric motor;
a hydraulic pump to be actuated by power of the electric motor;
a hydraulic device to be actuated by a hydraulic pressure of a hydraulic fluid delivered from the hydraulic pump;
a fluid temperature detector to detect a temperature of the hydraulic fluid;
a rotation speed detector to detect a rotation speed of the electric motor;
a specifier to be operated to specify the rotation speed of the electric motor; and
a controller configured or programmed to control driving of the inverter and the electric motor; wherein
the controller is configured or programmed to:
gradually increase the rotation speed of the electric motor such that the rotation speed of the electric motor reaches a target rotation speed in a longer time when the electric motor is started in a state in which the temperature of the hydraulic fluid detected by the fluid temperature detector is lower than or equal to a predetermined temperature than when the electric motor is started in a state in which the temperature of the hydraulic fluid is higher than the predetermined temperature, and
when the electric motor is started in a state in which the temperature of the hydraulic fluid is lower than or equal to the predetermined temperature:
determine a delay time, the delay time being a time until the rotation speed of the electric motor is stabilized at the target rotation speed, the target rotation speed being the rotation speed specified by the specifier; and
gradually increase the rotation speed of the electric motor such that the rotation speed of the electric motor is stabilized at the target rotation speed after the delay time has elapsed from when the rotation speed of the electric motor starts to be increased.

2. The electric working machine according to claim 1, wherein the controller is configured or programmed to calculate the target rotation speed according to an operating position of the specifier.

3. The electric working machine according to claim 1, further comprising:
a storage to store in advance basic control data indicating a change in the rotation speed of the electric motor to stabilize the rotation speed of the electric motor at a predetermined basic target rotation speed over a predetermined basic delay time; wherein
the controller is configured or programmed to determine, as the delay time, a time until the rotation speed of the electric motor reaches the target rotation speed when the rotation speed of the electric motor is changed based on the basic control data.

4. The electric working machine according to claim 3, wherein the basic control data is data including a curve indicating a correlation between the rotation speed of the electric motor and an elapsed time from an increase start time point of the rotation speed of the electric motor and includes a basic end point at which the elapsed time is the basic delay time and the rotation speed of the electric motor is the basic target rotation speed; and the controller is configured or programmed to correct the basic control data such that the basic end point coincides with a target end point at which the elapsed time is the delay time and the rotation speed of the electric motor is the target rotation speed so as to create control data indicating a change in the rotation speed of the electric motor to stabilize the rotation speed of the electric motor at the target rotation speed over the delay time and to control the rotation speed of the electric motor based on the control data.

5. The electric working machine according to claim 4, wherein the basic target rotation speed is set to a predetermined maximum rotation speed that is settable for the electric motor; and the controller is configured or programmed to create the control data by correcting the basic control data to be reduced such that the basic end point coincides with the target end point.

6. The electric working machine according to claim 4, wherein the controller is configured or programmed to, when gradually increasing the rotation speed of the electric motor to stabilize the rotation speed of the electric motor at the target rotation speed:

compare an actual rotation speed of the electric motor detected by the rotation speed detector with a control value for the rotation speed of the electric motor indicated by the control data at each of predetermined timings; and control the rotation speed of the electric motor so as to bring the actual rotation speed closer to the control value.

7. The electric working machine according to claim 4, wherein the controller is configured or programmed to:

determine a new target rotation speed according to an operating position of the specifier upon operation of the specifier when increasing the rotation speed of the electric motor in accordance with the control data;

change the delay time and the control data according to the new target rotation speed when the new target rotation speed is higher than an actual rotation speed of the electric motor detected by the rotation speed detector; and control the rotation speed of the electric motor in accordance with the changed control data.

8. The electric working machine according to claim 1, wherein the specifier is operable to specify a predetermined plurality of target rotation speeds;

the electric working machine further comprises a storage to store in advance, for each of the plurality of target rotation speeds, the corresponding delay time and control data indicating a change in the rotation speed of the electric motor to stabilize the rotation speed of the electric motor at the corresponding target rotation speed over the corresponding delay time; and the controller is configured or programmed to control the rotation speed of the electric motor based on the control data corresponding to any target rotation speed of the target rotation speeds, the target rotation speed being specified by the specifier.

9. The electric working machine according to claim 1, wherein, among an immediately-after-start section, an intermediate section, and an immediately-before-end section obtained by dividing a section from an increase start time point of the rotation speed of the electric motor to the delay time, the controller is configured or programmed to increase the rotation speed of the electric motor in proportion to an elapsed time from the increase start time point during the intermediate section, and change the rotation speed of the electric motor more gently during the immediately-after-start section and the immediately-before-end section than during the intermediate section.

10. The electric working machine according to claim 9, further comprising:

a working device to be actuated by power of the hydraulic device; and an operation interface to operate actuation of the working device; wherein the controller is configured or programmed to prohibit the actuation of the working device by operation of the operation interface during the immediately-after-start section.

11. The electric working machine according to claim 1, further comprising a display to display a notification indicating that the electric motor is being started while the rotation speed of the electric motor is gradually increased by the controller.

12. An electric working machine comprising:

a battery;

an electric motor;

an inverter to supply electric power from the battery to the electric motor to drive the electric motor;

a hydraulic pump to be actuated by power of the electric motor;

a hydraulic device to be actuated by a hydraulic pressure of a hydraulic fluid delivered from the hydraulic pump;

a fluid temperature detector to detect a temperature of the hydraulic fluid;

a rotation speed detector to detect a rotation speed of the electric motor;

a controller configured or programmed to control driving of the inverter and the electric motor; and a storage to store control data indicating a change in the rotation speed of the electric motor to stabilize the rotation speed of the electric motor at a predetermined target rotation speed over a predetermined delay time; wherein the controller is configured or programmed to gradually increase the rotation speed of the electric motor based on the control data stored in the storage such that the rotation speed of the electric motor reaches a target rotation speed in a longer time when the electric motor is started in a state in which the temperature of the hydraulic fluid detected by the fluid temperature detector is lower than or equal to a predetermined temperature than when the electric motor is started in a state in which the temperature of the hydraulic fluid is higher than the predetermined temperature.

13. The electric working machine according to claim 12, further comprising:

a specifier to be operated to specify the rotation speed of the electric motor; wherein the controller is configured or programmed to determine, as the delay time, a time until the rotation speed of the electric motor reaches the predetermined target rotation speed which is specified by the specifier, and create the control data.

* * * * *